(12) United States Patent
Schneiderman

(10) Patent No.: US 7,082,604 B2
(45) Date of Patent: Jul. 25, 2006

(54) METHOD AND APPARATUS FOR BREAKING DOWN COMPUTING TASKS ACROSS A NETWORK OF HETEROGENEOUS COMPUTER FOR PARALLEL EXECUTION BY UTILIZING AUTONOMOUS MOBILE AGENTS

(75) Inventor: Marc Schneiderman, Delray Beach, FL (US)

(73) Assignee: Mobile Agent Technologies, Incorporated, Delray Beach, FL (US)

( * ) Notice: Subject to any disclaimer, the term of this patent is extended or adjusted under 35 U.S.C. 154(b) by 756 days.

(21) Appl. No.: 09/838,806

(22) Filed: Apr. 20, 2001

(65) Prior Publication Data

US 2002/0156932 A1 Oct. 24, 2002

(51) Int. Cl.
*G06F 9/46* (2006.01)
*G06F 15/16* (2006.01)
*G06F 15/173* (2006.01)
*G01R 31/28* (2006.01)
*G06F 9/00* (2006.01)

(52) U.S. Cl. ............... 718/100; 709/202; 709/223; 709/224; 709/246; 714/715; 713/1

(58) Field of Classification Search ........ 718/100–108; 719/317; 709/202–246; 714/715; 713/1
See application file for complete search history.

(56) References Cited

U.S. PATENT DOCUMENTS

| 5,790,431 A | 8/1998 | Ahrens, Jr. et al. ......... 364/569 |
| 6,009,455 A | 12/1999 | Doyle ......................... 709/201 |
| 6,009,456 A | 12/1999 | Frew et al. ................... 709/202 |
| 6,016,393 A | 1/2000 | White et al. ................. 395/683 |
| 6,055,562 A | 4/2000 | Devarakonda et al. ...... 709/202 |
| 6,065,039 A * | 5/2000 | Paciorek ...................... 709/202 |
| 6,065,040 A | 5/2000 | Mima et al. ................. 709/202 |
| 6,125,402 A | 9/2000 | Nagarajayya et al. ....... 709/304 |
| 6,330,583 B1 * | 12/2001 | Reiffin ......................... 718/105 |
| 6,496,871 B1 * | 12/2002 | Jagannathan et al. ....... 719/317 |

(Continued)

OTHER PUBLICATIONS

Chess et al., "Itinerant Agents for Mobile Computing", IEEE, 1995, pp. 34-49.*

(Continued)

*Primary Examiner*—Meng-Al T. An
*Assistant Examiner*—Jennifer N. To
(74) *Attorney, Agent, or Firm*—Brown Raysman, Millstein Felder & Steiner LLP

(57) ABSTRACT

A method and apparatus is provided for breaking down computing tasks within a larger application and distributing such tasks across a network of heterogeneous computers for simultaneous execution. The heterogeneous computers may be connected across a wide or local area network. The invention supports mobile agents that are self-migrating and can transport state information and stack trace information as they move from one host to another, continuing execution where the mobile agents may have left off. The invention includes a server component for providing an execution environment for the agents, in addition to sub-components which handle real-time collaboration between the mobile agents as well as facilities monitoring during execution. Additional components provide realistic thread migration for the mobile agents. Real-time stack trace information is stored as the computing tasks are executed, and if overutilization of the computing host occurs, execution of the computing task can be halted and the computing task can be transferred to another computing hosts where execution can be seamlessly resumed using the stored, real-time state information and stack trace information.

38 Claims, 36 Drawing Sheets

U.S. PATENT DOCUMENTS

| | | | |
|---|---|---|---|
| 6,529,932 B1* | 3/2003 | Dadiomov et al. | 718/101 |
| 6,549,932 B1* | 4/2003 | McNally et al. | 709/202 |
| 6,587,432 B1* | 7/2003 | Putzolu et al. | 370/229 |
| 6,735,691 B1* | 5/2004 | Capps et al. | 713/1 |
| 6,738,813 B1* | 5/2004 | Reichman | 709/224 |
| 6,789,114 B1* | 9/2004 | Garg et al. | 709/224 |
| 6,859,931 B1* | 2/2005 | Cheyer et al. | 719/317 |
| 6,871,223 B1* | 3/2005 | Drees | 709/223 |
| 6,886,046 B1* | 4/2005 | Stutz et al. | 709/246 |
| 6,990,616 B1* | 1/2006 | Botton-Dascal et al. | 714/715 |
| 7,003,770 B1* | 2/2006 | Pang et al. | 718/100 |
| 2001/0016911 A1* | 8/2001 | Obana | 713/180 |
| 2004/0205772 A1* | 10/2004 | Uszok et al. | 719/317 |

OTHER PUBLICATIONS

Davis et al., "An Implementation of MLS on a Network of Workstations Using X.500/509", IEEE, 1997, pp. 546-553.*

Vogler et al., "An Approach for Mobile Agent Sercurity and Fault Tolerance Using Distributed Transaction", IEEE, 1997, pp. 268-274.*

Liotta et al., "Modelling Network and System Monitoring Over the Internet With Mobile Agents", IEEE, 1998, pp. 303-312.*

Fukada, et al., "A Hierarchical Mapping Scheme for Mobile Agent Systems," 6th IEEE Workshop on Future Trends of Distributed Computing Systems (FTDCS '97).

Gray, "A Flexible and Secure Mobile-Agent System," A Thesis, Dartmouth College, Jun. 30, 1997.

Gray, "A Flexible and Secure Mobile-Agent System," Dr. Dobb's Journal, Mar. 1997.

Gray, et al. "Mobile Agents: The Next Generation in Distributed Computing," 2nd AIZU International Symposium on Parallel Algorithms/Architecure Synthesis (pAs '97) pp. 8-24.

Jain, et al., "A Comparison of Mobile Agent and Client-Server Paradigms for Information Retrieval Tasks in Virtual Enterprises," Telcordia Technologies, Inc.

Karnik, et al. "Design Issues in Mobile-Agent Programming Systems," IEEE Concurrency, Jul.-Sep. 1998, pp. 52-61.

Kiniry, et al. "A Hands-On Look at Java Mobile Agents," IEEE Internet Computing, Jul./Aug. 1997, pp. 21-30.

Lange, "Java Aglet Application Programming Interface (J-AAPI) White Paper—Draft 2," IBM Tokyo Research Laboratory, Feb. 19, 1997.

Mitsubishi Electric ITA, "Mobile Agent Computing," Jan. 19, 1998.

Puliafito, et al. "An Analytical Comparison of the Client-Server, Remote Evaluation and Mobile Agents Paradigms," Third International Symposium Mobile Agents, Oct. 1999.

Ranganathan, et al., "Network-Aware Mobile Programs" 1997 USENIX Annual Technical Conference, Anaheim, California, Jan. 6-10, 1997.

Samaras, et al."Mobile Agent Platforms for Web Databases: A Qualitative and Quantitative Assessment," Department of Computer Science, University of Cyprus.

Sundaresan, et al. "Java Paradigms for Mobile Agent Facilities".

Wong, et al. "Java-Based Mobile Agents," Communications of the ACM, vol. 42. No. 3, Mar. 1999, pp. 92-102.

Press Release by International Knowledge Systems regarding Agentx product, Aug. 2, 1999 (1 page).

Agentx product descripton from http://www.iks.com/agentx.htm (1 page).

Schneiderman, "Agentx Distributed Computing Technology for the Next Millennium," White Paper, 14 pages.

Lange, et al., "Programming and Deploying Java Mobile Agents With Aglets," Chapter 7, pp. 117-134.

* cited by examiner

METHOD AND APPARATUS FOR BREAKING DOWN COMPUTING TASKS ACROSS A NETWORK OF HETEROGENEOUS COMPUTER FOR PARALLEL EXECUTION BY UTILIZING AUTONOMOUS MOBILE AGENTS

BACKGROUND OF THE INVENTION

1. Field of the Invention

The present invention relates to a method and apparatus for providing parallel execution of computing tasks in heterogeneous computing environments using autonomous mobile agents. More specifically, the invention allows a multitude of computing tasks to be broken down into smaller tasks, distributed across a variety of nodes, and computed in parallel by such nodes. Computing tasks can be distributed to a plurality of nodes by self-migrating, autonomous mobile agents that are capable of carrying state information from one host to another host. Execution of computing tasks can be interrupted at a first host and transferred to a second host, where execution can then be seamlessly completed. The invention provides a means for collaborating the agents in real time, facility monitoring means for the agents, debugging means for allowing realistic thread migration of the agents, and dispatching means capable of breaking down given computing tasks into smaller tasks to be executed by a plurality of agents simultaneously executed across heterogenous, networked computing environments.

2. Related Art

Since the dawn of the computer age, scientists, academic researchers, engineers and programmers have attempted to design, develop, and refine systems to provide increasingly optimized uses of available computing resources. While attempting to achieve these goals, such efforts have sought to continually lower the overall cost of each mathematical or logical instruction executed within a program. Ultimately, these endeavors sought to create a computer program and/or system that was more reliable and less subject to network failures.

In the 1970's, remote procedure calls gained acceptance in the IBM mainframe environment. This was the result of improved communications technologies and protocols that enabled a secondary computer system to invoke a program written and executed on an IBM mainframe host, and to return the results of computation to the secondary computer.

In the late 1980's, the concept of client/server computing gained popularity, and in a broad sense, supported the notion of remote programming. This technique, whereby a set of instructions could be passed to a server for execution thereon, created a new architecture based upon a two tier computing model. One example of this is a Structured Query Language ("SQL") statement that can be created on one computer and then executed by a remote server. Typically, the SQL code is created via a graphical user interface located at the client.

In the 1990's, a major shift in programming paradigms occurred. The structure of computer programs began to move from the traditional procedural model to object-oriented models. Additionally, there was a renewed vigor to develop distributed computing technologies that would allow computer programs to be broken up and executed across two or more machines connected via a network.

Companies such as Microsoft, Sun Microsystems, and Visigenics have produced products, language facilities, and operating system enhancements that allow an object residing on one machine on a computer network to remotely call the methods within another object located on a second computer system. Microsoft's technology, Distributed Component Object Model ("DCOM"), was originally proprietary and could only be used within the Windows® environment. Sun Microsystems created two new programming API's for its Java® programming language, namely Remote Method Invocation ("RMI") and Enterprise Java Beans ("EJB"). Visigenic implemented specifications set forth by the Object Management Group ("OMG") to provide a distributed computing technology called Common Object Request Broker Architecture ("CORBA").

All of the above technologies required remote objects to be installed on the computer systems where such technologies were to be run. Additionally, variation of client-side stubs and server-side skeletons was required to effectuate the marshalling and unmarshalling of returned data and parameter values. Accordingly, the limitations and shortcomings inherent in the above technologies have precipitated the need to create object-oriented software programs that can transport themselves from one machine to another without requiring a user to install software on the remote computers and without requiring any modification of virtual machines residing thereon. Further, the need arises for such programs to traverse a heterogeneous network of computing devices that may be connected via potentially unreliable communication channels.

To date, organizations undertaking the monumental challenge of developing and introducing mobile agent technologies to address the above needs have achieved very limited success. This is due to both the radical shift in computing paradigms inherent in distributed computing and a lack of viable architectural designs and methodologies. Some of the more notable projects in the academic realm pertaining to mobile agent technologies include "Agent TCL" developed at Dartmouth and Tacoma developed at Cornell University. In the corporate realm there are such products as IBM's Aglet workbench, Mitsubishi's Concordia, and General Magic's Telescript/Oddessy. As noted earlier, however, such products fail to address the need to provide easily transportable mobile agents that function efficiently in heterogeneous computing environments.

An additional need exists in the mobile agent technology realm; namely, the need to provide mobile agents that support real-time thread migration. Prior to the present invention only mobile agent systems written in languages other than Java, such as TCL or Telescript, could support thread migration. In the late 1990's, thread migration using the Java programming language could be achieved only by modifying the virtual machine itself, which severely reduced the attractiveness of a mobile agent product by requiring a proprietary Java virtual machine. The present invention, by contrast, provides realistic thread migration using a standard, off-the-shelf Java Virtual machine, without requiring the modification of the virtual machine or the creation of a proprietary virtual machine.

None of the previous efforts of others, either alone or in combination, disclose or teach the benefits of the method and apparatus of the present invention for providing parallel execution of computing tasks in heterogeneous computing environments using autonomous mobile agents, nor do they teach or suggest all of the elements thereof.

OBJECTS AND SUMMARY OF THE INVENTION

It is a primary object of the present invention to provide for improved distributed computing over a plurality of computing systems.

It is another object of the present invention to provide for improved parallel processing of computing tasks over a variety of distributed computing systems.

It is yet another object of the present invention to provide for improved processing of computing tasks by a plurality of computing systems regardless of the underlying operating systems and hardware of such computing systems.

It is still another object of the present invention to provide an improved distributed computing system wherein computing tasks are accomplished by a plurality of virtual machines residing in nodes connected to the distributed computing system, without requiring a user to install software at the nodes or to modify the virtual machines.

It is another object of the present invention to provide a collaboration environment wherein a plurality of mobile agents can communicate with each other in real time.

It is also an object of the present invention to provide a dispatching system wherein complex computational tasks are broken down into smaller computational tasks and distributed to a plurality of computing systems using mobile agents.

It is yet another object of present invention to provide a monitoring system wherein status information corresponding to mobile agents can be recorded and monitored.

It is a further object of the present invention to provide a debugging system for a computing host wherein the execution stack for running mobile agents can be maintained, reconstructed, and traced.

It is still another object of the present invention to provide improved thread migration for mobile agents, wherein a plurality of mobile agents can be migrated from one computing system to another and withstand interrupted execution.

It is yet an additional object of the present invention to provide improved thread migration without requiring a user to install software at a plurality of computing nodes or to modify virtual machines located therein.

It is an object of the present invention to provide improved dynamic distribution of mobile agent processing code from a web server to plurality of client virtual machines so that mobile agents can be executed on clients not having mobile agent processing code.

A method and apparatus is provided for breaking down computing tasks within a larger application and distributing such tasks across a network of heterogeneous computers for simultaneous execution. The heterogeneous computers may be connected across a wide or local area network. The invention uses mobile agents that can be self-migrating and can transport real-time state information as they move from one host to another, thereby allowing for continued execution where the mobile agents may have left off. The invention includes a server component for providing an execution environment for the agents, in addition to sub-components for handling real-time collaboration between the mobile agents and providing facilities monitoring during execution. A dispatcher that facilitates the break down of a complex computational task into smaller, more optimized parts is provided. Execution code can be dynamically transferred to remote nodes so that the mobile agents can execute in virtual machines located therein, without requiring modification to the virtual machines.

Additional components provide realistic thread migration and a collaboration environment for the mobile agents. Realistic thread migration is provided through the storage and later serialization of state information and execution stack trace information prior to migration of an agent from one host to a secondary host. The state information and execution stack trace information is then utilized by the secondary host to reconstruct the agent's state of execution prior to migration to the secondary host, so that seamless execution of the agent can be achieved across more than one host.

A collaboration environment allows the mobile agents to exchange data and messages while executing. Conference rooms provide a virtual workspace for the mobile agents, and a registration subsystem selectively assigns the mobile agents to the conference rooms. The conference room monitors and moderates communication between the mobile agents, also allowing them to share results of computations.

BRIEF DESCRIPTION OF THE DRAWINGS

Other important objects and features of the present invention will be apparent from the following Detailed Description of the Invention, taken in connection with the accompanying drawings wherein like reference numerals refer to like parts, in which.

DETAILED DESCRIPTION OF THE INVENTION

Figure 1:
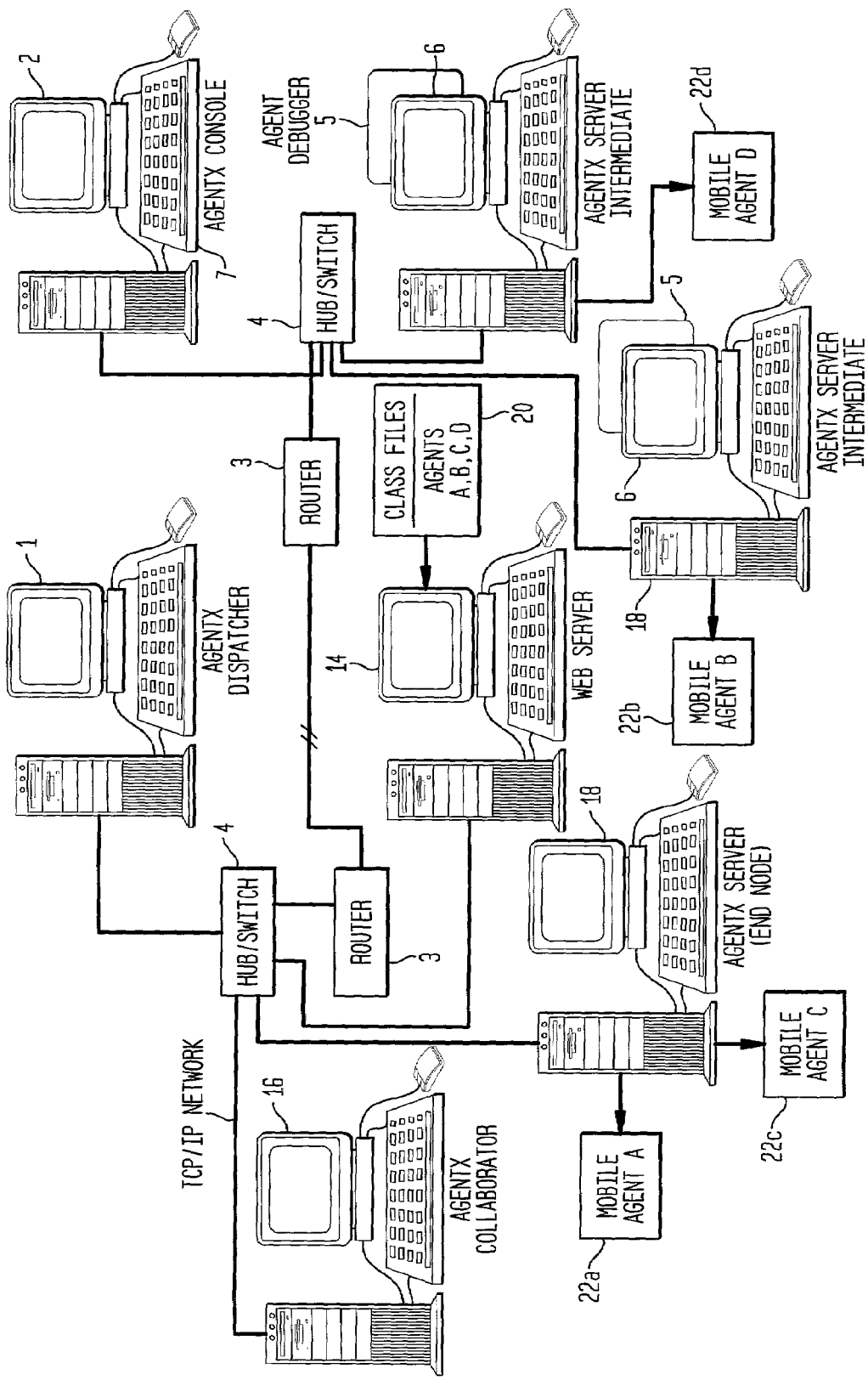
FIG. 1 is a diagram showing system architecture of the present invention.

The methodologies, software components, architecture, and flowcharts of the present invention constitute a complete system that is capable of systematic breakdown of a computationally intensive task into smaller parts for distribution across a network. In addition, the invention provides autonomous mobile agents that have the ability to migrate freely across a network of computers having a multitude of operating systems. The entire system of the present invention can be executed using a plurality of commercially-available virtual machines residing in remote computer systems, without requiring modification by the user of such virtual machines.

To assist the reader, the following glossary of terms used in this document is provided. The definitions in this glossary are not exhaustive and are not to be used to limit the scope of the present invention.

Glossary of Terms

AddObserver( ) Method: a function within the standard Java Observable class which allows for the addition of Observer objects.

Admin class: a proprietary class that contains methods to perform administrative tasks such as registering a management console.

Agent: A computer program that acts on behalf of a user or set of data or instructions provided by the user.

Autonomous Mobile Agent: An agent that is not bound to the system where it originates, and is capable of transporting itself from one machine to another machine residing on a network.

Bytecodes: A compiled version of instructions written in the Java programming language.

Class: An association of objects, data, and procedures commonly known in the object-oriented programming art.

ClassLoader: a standard Java abstract class that can be used to define policies for loading Java classes into a runtime environment.

Class Loading Mechanism: a facility that provides desired functionality for specific policies within an implementation of the ClassLoader class.

ClassNotFoundException: a standard Java exception created when a class loader is unable to load a specified class.

DefaultMutableTreeNode: a general-purpose node in a tree data structure, which may have at most one parent and zero or more children. DefaultMutableTreeNode provides operations for examining and modifying a node's parent and children, in addition to operations for examining the tree to which the node belongs. A node's tree is the set of all nodes that can be reached by starting at the node and following all possible links to parents and children. A node with no parent is the root of its tree; a node with no children is a leaf. A tree may consist of many subtrees, each node acting as the root for its own subtree.

GetResults( ): a method within an AgentMessage class that retrieves the results of an RMI method call or the results of computation returned from a remotely-executing mobile agent.

GetRunningAgentNames( ): a method within the Admin class that obtains a list of names representing agents currently running on an agent server.

GoToWork( ): a method within the Agent class that is used to launch a mobile agent.

Instantiate: The process of creating an object to be used by a program.

IOException: a standard Java exception created when a runtime error occurs during an input or output stream operation performed on a file or socket connection.

Listening Thread: A computing process that waits for one or more actions to occur in a computing environment, and alerts another process when a desired action occurs. Often used to describe a server-side component that waits for an incoming socket connection originating from a client initiating a request to submit.

LoadClass: a method within the ClassLoader class that loads a class using a policy defined within the ClassLoader class.

MalformedURLException: a Java language exception created during the instantiation of a URL object if a parameter passed to the constructor of the object does not represent a valid URL.

NotifyObservers( ): a method within the Java Observable class which notifies observers that a property of an observable object has changed.

Push stack event: a process by which the name of a method to be invoked and its associated parameters are placed on an execution stack.

Realistic Thread Migration: The process by which the current execution state of a mobile agent can be captured prior to migration of the agent across a network, and reconstructed at a remote server host when the agent has successfully relocated to the remote server host. Additionally, a process by which the simulated serialization of a thread and its movement between two distinct virtual machines, can be accomplished without modifying the runtime environment or using a programming language other than Java.

Remote Method Invocation ("RMI"): a process by which one program running on one machine can invoke a procedure within a program running on a secondary machine.

SetChanged( ): a method within the Java Observable class that records changes in an observable object.

Skeleton: A server-side implementation of a stub.

SocketException: a Java language exception created when a socket connection cannot be created.

Stack trace: A set of function calls and the parameters passed to them which are invoked as a computer program executes and organized in the chronological sequence in which they are called; also referred to as "execution stack trace."

State Information: Information regarding the execution status of a mobile agent.

Stub: A client-side software component, oftentimes automatically generated by a distributed computing tool, which handles the marshalling and unmarshalling of data through a socket connection when communicating to a remotely-deployed object.

Swing Components: Components within the Java programming language that allow a programmer to implement Graphical User Interface ("GUI") components such as buttons, lists, menus, and text areas.

Thread: A single sequential flow of control within a computing process. The process may have multiple, concurrently executing threads.

Thread Migration: The capability of a mobile agent, in the midst of execution, to transport itself from one server node to another, and upon arrival at the secondary node, to continue executing at the point at which it left off.

Update( ): a Java language construct that denotes a named method within a class for receiving incoming events that are initiated or delivered from other components within a system.

Virtual Machine: A program that operates as a separate computing environment, may be implemented across a variety of hardware and software architectures, and is capable of executing instructions written in a programming language.

A preferred embodiment of the present invention comprises a number of agent servers interconnected via a TCP/IP network, wherein there are two distinct types of servers. The first type is designed to be an intermediary that can participate in the actual launching or migration of agents onto other specified servers. The second type is an end node that is capable of receiving and executing agents, but is not capable of launching or migrating agents. Both servers provide an environment in which autonomous mobile agents may be independently executed.

The agent servers function as software building blocks that allow the creation of additional, highly-specific system components. An agent dispatcher subsystem that breaks down computationally intensive tasks is built upon an agent server. This subsystem is responsible for breaking down a computing task, identifying appropriate agent servers, launching the agents and processing or reassembling the intermediate results. An agent monitor, which includes a management display console, is built on top of an agent server. The display console visually depicts those machines working as agent servers within the system. Additionally, the console visually displays agents as they initialize, begin execution, run, and stop execution, in real-time. In a preferred embodiment of the invention, the console is implemented as a Java application having a user interface developed with Swing components.

Two integral subsystems of the invention that are not built into the agent server but form part of the invention are the agent collaborator and agent debugger. The agent collaborator works as a virtual meeting room in which information can be shared between all of the executing mobile agents in attendance. The agent debugger monitors the execution of all active agent processes running on a specific host. It automatically stores a complete stack trace of all executing agents in real-time. The debugger may or may not reside on the same host as the agents it monitors. The facilities available as a result of the agent debugger allow for realistic thread migration, whereby an agent can migrate from one host to another and begin execution in a new environment at virtually the same point where the agent terminated execution prior to migration.

An industry-standard component utilized by the present invention is a standard web server which utilizes the Hyper-text Transfer Protocol ("HTTP") to transfer data. The web server, in an embodiment of the invention, is used as a storage facility for mobile agent classes. Via a network-aware class loading mechanism, bytecodes for any mobile agent or dependent class can be downloaded to a local agent server from the closest or least-used web server. This approach significantly reduces network traffic and agent travel times, as opposed to other approaches contemplated in the art.

The present invention implements a proprietary, light-weight, and highly portable form of RMI that is used internally by the system but can also be used by those who create software programs with the present invention. The most common implementations of RMI known in the art require the creation of related classes known as "stubs" and "skeletons." These classes, which are usually generated by an automated tool, handle low-level socket communications. Additionally, they provide for the marshalling and unmarshalling of requests made from the client to the server. The most common RMI-related implementations in the art require a universal name space, such as Java's JNDI. Importantly, the implementation of RMI achieved by the present invention does not require the creation of stubs and skeletons, nor is any type of object discovery service required.

Referring to the accompanying drawings, in which like reference numerals refer to like parts, FIG. 1 is a system-level diagram of the present invention. Agent dispatcher 1 breaks down a computationally-intensive task and then distributes it in the form of mobile agents 22a, 22b, 22c, 22d to carry out a portion of the task. A network comprising one or more routers 3 and a plurality of hubs 4 connects a plurality of computer systems and can be based upon theTCP/IP protocol. Connected to hub 4 are one or more computer systems of various manufacture running different operating systems but all having a Java 1.1 or higher virtual machine installed and available.

All mobile agents run within an environment known as an "agent server" of which there are two types, end node 18 and intermediate node 6. An agent server, agent console, agent collaborator, and agent dispatcher can operate on any computer system 7 presently known in the art and capable of supporting a Java virtual machine bearing version numbers 1.1 or higher.

Built upon the agent servers are other, more complex subsystems. Agent dispatcher 1, described above, breaks down a computing task into smaller parts for simultaneous execution. Additionally, agent console 2 provides a real time management display as the agents traverse the network. Agent collaborator 16 provides the agents with a place to meet and exchange information, regardless of where the agent is located on the network.

Agent debugger 5 stores the stack traces of agents as they execute within the agent server environment. This subsystem provides a major technological advantage, namely realistic thread migration. Prior to the present invention, all Java-based mobile agent systems seeking to provide thread migration had to implement custom modifications to the virtual machine in order to do so. Significantly, the present invention provides such thread migration without requiring modifications to the underlying virtual machine.

Web server 14 is used to store the compiled bytecodes of the mobile agents. The agent servers make HTTP calls to the web server to download the bytecodes as necessary. Web server 14 transfers compiled bytecodes 20 to any mobile agents executing on remote systems and requiring such bytecodes for remote execution. Importantly, web server 14 allows compiled bytecodes 20 to be downloaded using a customized class loading mechanism and the industry-standard HTTP protocol.

Figure 2A:
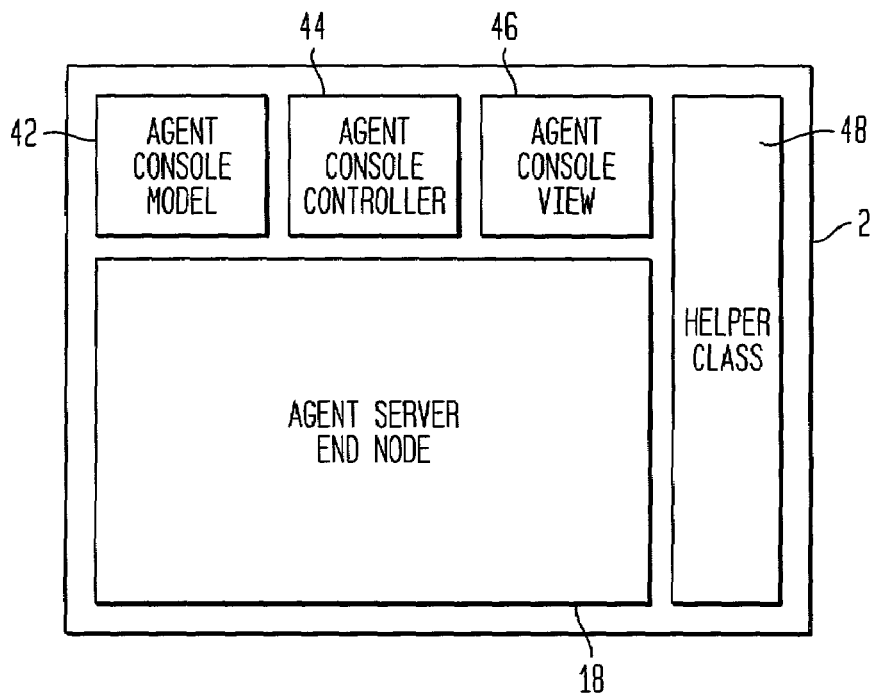
FIG. 2a is a diagram showing the agent console monitor of the present invention.

FIG. 2a represents the architecture of agent console 2 of the present invention. Within this subsystem there are several core subcomponents. Console model 42, which holds all data representing running servers and agents, is a complex, tree-like data structure loosely based on an acyclical redundancy graph. Console controller 44 is the subsystem's connection to the outside world, through which it registers itself with all active servers and receives messages containing status updates. Console view 46 is a graphical user interface for the management console. Helper class 48 performs background tasks such as acquiring a list of running servers. Agent server end node 18 provides an appropriate execution environment for mobile agents and is described in more detail in FIG. 3a.

Figure 2B:
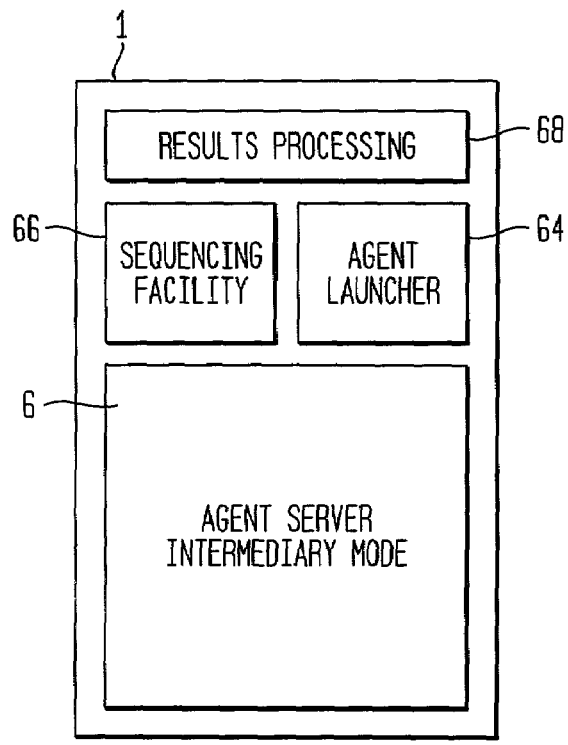
FIG. 2b is a diagram showing the agent dispatcher of the present invention.

FIG. 2b is a diagram of agent dispatcher 1 of the present invention. Sequencing facility 66 is responsible for the programmatic breakdown of a computation into smaller sub-components embodied as agents. Agent dispatcher 1 also assigns a sequence in which to launch the mobile agents. Agent launcher component 64 identifies and prepares all of the agents that need to be transported to remote server nodes. After preparation, each agent is then launched in turn. Results processing subsystem 68 receives the product of the computations as they execute on any number of remote nodes, caches, and then assembles the intermediary processes into a final result. Agent dispatcher 1 is built upon agent server intermediary node 6, described in detail in FIG. 3d.

Figure 3A:
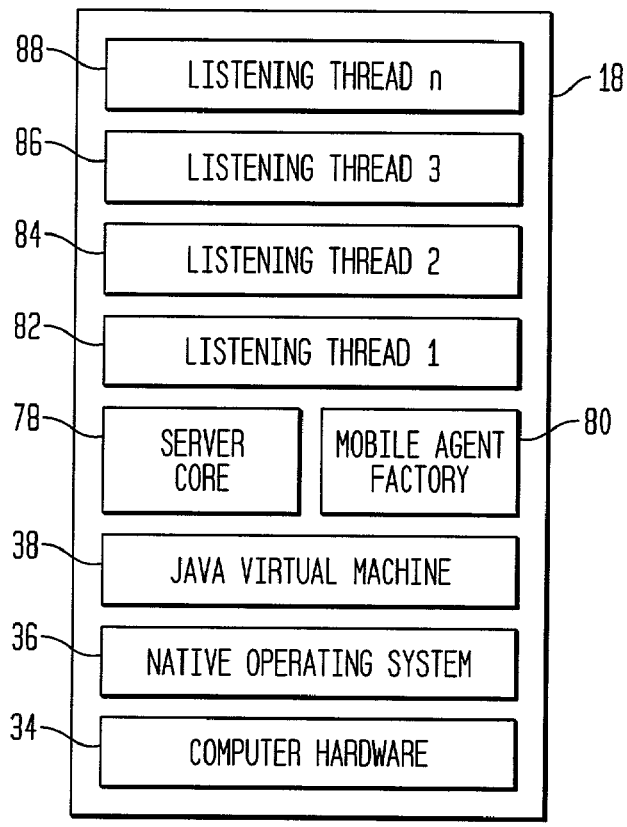
FIG. 3a is a diagram showing an end note agent server of the present invention.

FIG. 3a is a diagram showing agent server end node 18 of the present invention. Computer hardware 34 represents any type of computer hardware known in the art. Operating system 36 represents any operating system known in the art that is capable of supporting a Java 1.1 or higher virtual machine 38. Server core 78 creates and manages listening threads, retrieves default values from property files, and handles the underlying socket-level communications between the server and its client. Server core 78 utilizes default deserialization procedures inherent in the Java programming language to create objects from bytestreams read from socket connections. Mobile agent factory 80 is an object that manufactures new agents locally after first gathering initialization criteria from message objects passed to the server from a connected client residing anywhere on the network.

Listening threads 82, 84, 86, 88 contain logic to receive and process either an agent message or a mobile agent instance that has migrated from a remote server. It is to be understood that additional listening threads can exist, depending upon the number of entries in a disk based properties file. Encapsulated within listening threads 82, 84, 86, 88 are pieces of information indicating whether a mobile agent should be manufactured or a local method should be invoked. In response to the pieces of information, the server pools the listening threads. In the pool, each thread sits idle while awaiting a connection request. When the connection is accepted, a thread is removed from the waiting pool and allowed to process the request. Upon completing this task, the thread is returned to the waiting pool.

Figure 3B:
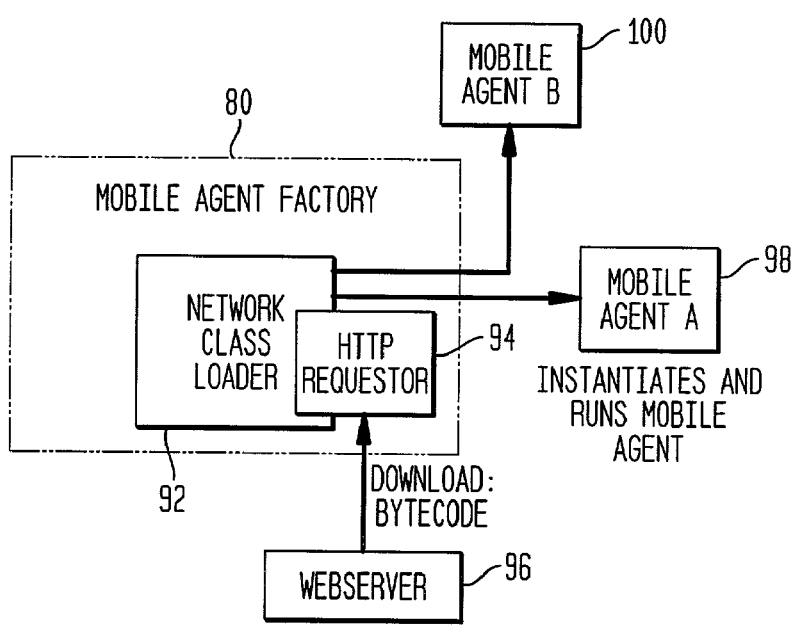
FIG. 3b is a diagram showing the mobile agent factory of the present invention.

FIG. 3b depicts the mobile agent factory 80 of the present invention. Mobile agent factory 80 dynamically creates agents and relies upon Java's base API's built into the "Class" object to create new classes 100, 98, instantiating them on demand. Network based class loader 92 can easily and efficiently download agent class files in the form of Java bytecodes from any standard web server residing on the network. In a preferred embodiment of the invention, multiple web servers 96 may exist on the network, such that agent servers can download bytecodes from the nearest web server, thus significantly relieving network traffic. Network class loader contains an HTTP requester 94 that simulates a "GET" request to web server 96 in a fashion similar to a normal web browser.

Figure 3C:
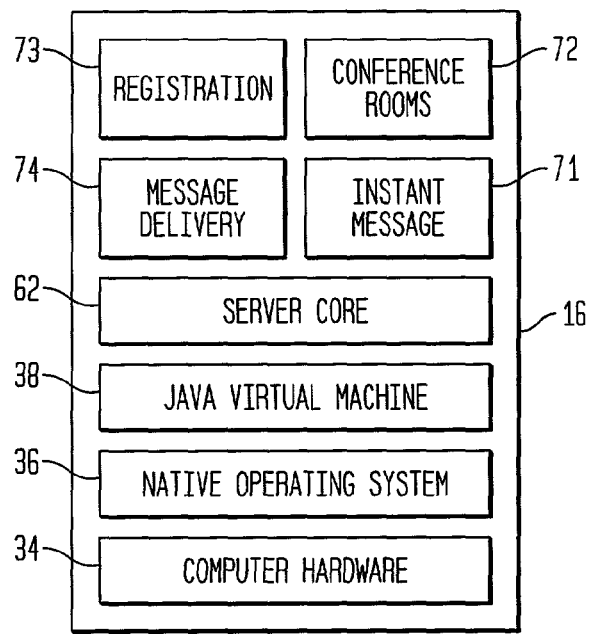
FIG. 3c is a diagram showing the agent collaborator of the present invention.

FIG. 3c represents the architecture of agent collaborator 16 of the present invention. Computer hardware 34 may be of any manufacture, running any native operating system 36. Computer hardware 34 has an installed Java virtual machine 38, version 1.1 or later. A Java Virtual Machine having a version of 1.1 or higher is required because the present invention utilizes functionality of the Java language that appears only in versions 1.1 or higher. It is to be understood that the present invention is equally compatible with versions of the Java programming language having version numbers higher that 1.1.

The server core 62 is of the same design as an agent server. Registration subsystem 73 handles all of the live connections with agents, no matter where they are located within the network. Additionally, registration subsystem 73 also informs the agents of all active conferences occurring in real time.

Conference rooms 72 provide a virtual workspace in which one or more agents can collaborate and share information, including partial or complete results from computations. This component is responsible for starting, stopping, monitoring and or moderating all conference proceedings. In conference rooms 72, agents from any part of the system can meet in a virtual environment without ever having to physically reside on the same computer system. Instant messenger component 71 allows two agents to establish a private channel of communications between themselves at any point in time. This approach allows one agent to communicate with another agent located anywhere on the network. The agent being contacted has the ability to accept or decline.

Message delivery subsystem 74 is responsible for ensuring that all data and communications by one or more collaborating agents is both transmitted and received by the appropriate parties. Message delivery can be guaranteed if necessary. In an embodiment of the invention, a standard message queue allows all messages to be placed on the queue and then read and removed by those with the correct permission. Other guaranteed communications methodologies supported by the invention are "publish" and "subscribe." With this approach, one agent registers itself as a listener requesting all messages for a certain topic. Another agent can register itself as a publisher, providing content relating to one or more established topics.

Figure 3D:
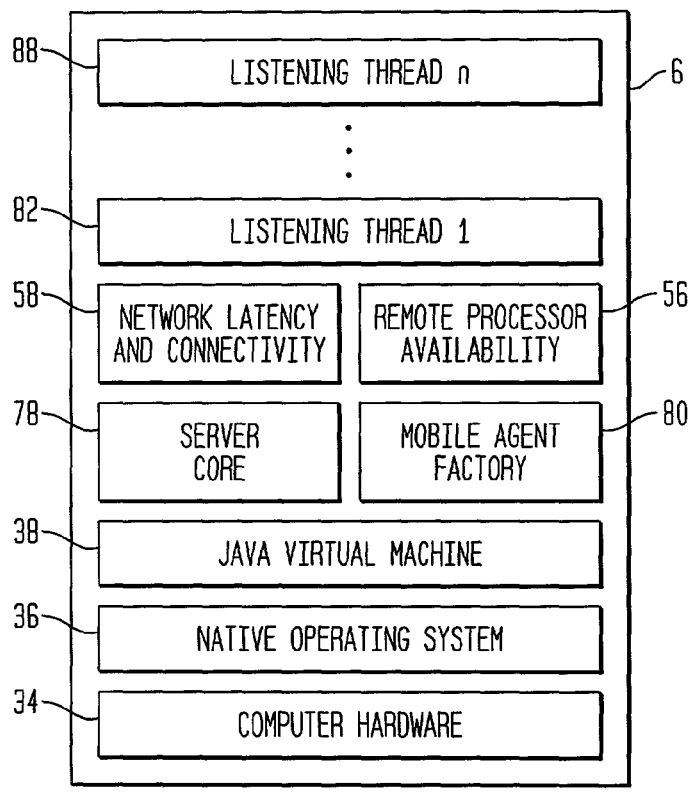
FIG. 3d is a diagram showing an intermediate node of the agent server of the present invention.

FIG. 3d represents an agent server intermediary node 6. Agent server intermediary node 6 comprises all of the components of agent server end node 18, described above. Additionally, agent server intermediary node 6 is further comprised of a network latency and connectivity subsystem 58, in addition to remote processor availability module 56. Network latency and connectivity subsystem 58 transmits sample data packets to secondary agent servers determined to be active at predefined intervals using the commonly known TCP/IP "ping" utility. Network latency and connectivity subsystem 58 then notes the amount of time elapsed prior to a response. Based upon an algorithm defined in FIG. 28, the server may be removed from the active server list. Remote processor availability module 56 monitors the state of the local processor and memory to determine system availability. It uses an algorithm detailed in FIG. 29 to decide if the present processor's resources and memory are sufficient to ensure a suitable execution environment for migrating agents. Remote processor availability module 56 responds to processor status requests from other agent server intermediary nodes.

Figure 3E:
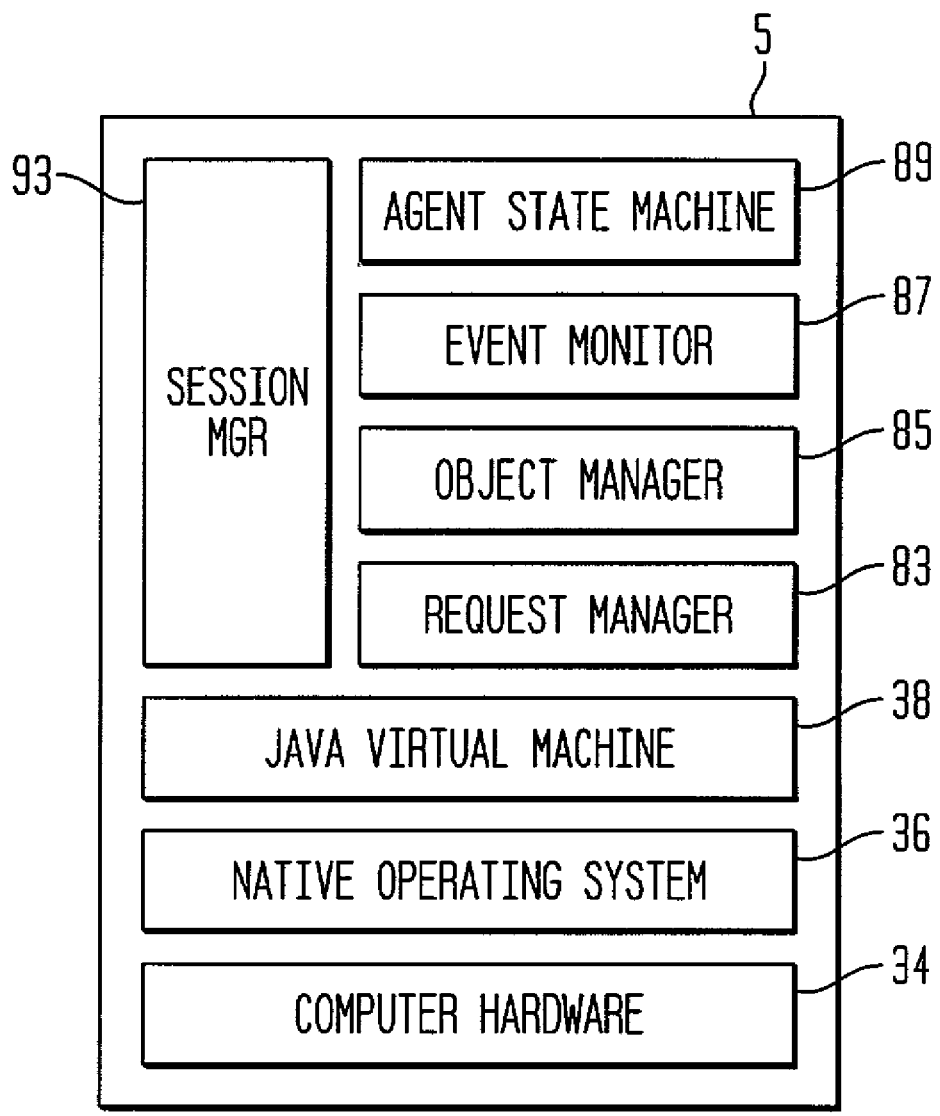
FIG. 3e is a diagram of the agent debugger of the present invention.

FIG. 3e is a diagram showing the agent debugger 5 of the present invention. Importantly, agent debugger 5 provides realistic thread migration. Agent debugger 5 comprises standard computer hardware 34, native operating system 36, and Java Virtual Machine 38. Session manager 93 is a manager responsible for establishing and maintaining a connection with one or more agent servers. The agent servers may reside either on the same computer as the agent debugger or at remote systems on the network. Request manager 83 is responsible for submitting monitoring requests to each of the agent servers to which that agent debugger 5 connects.

Object manager 85 tracks the creation of all mobile agent objects as they are instantiated and allowed to execute within the agent server environment. Event monitor component 87 receives events generated by the agent server environment. The events are filtered to allow only those events denoting the preparation of a class (object creation) as well as method entry points being reached. Class prepare events are passed on to object manager 85, while events denoting method entry points being reached are passed to agent state machine 89. Agent state machine 89 stores stack trace information for all running agents. When a method entry point event is reached and the name of the function is migrated, then agent state machine 89 determines that the agent needs to be transported to another remote server, with execution continuing at the point where it left off. Upon such transfer, the running agent is frozen, such that its currently executing thread is stopped. The agent is then serialized and moved to another remote host where information stored in agent state machine 89 is used to reconstruct the agent's previous state, so that execution may begin at the point at which it left off.

One embodiment of the present invention allows for the development of business application programs capable of transporting themselves, during execution while maintaining state, to alternative hosts. Such programs may reside on the same sub-net or anywhere on the Internet. Transportation of the programs may be triggered by abnormally high network traffic, possible computer hardware failure, or hostile attacks by computer hackers.

Figure 4:
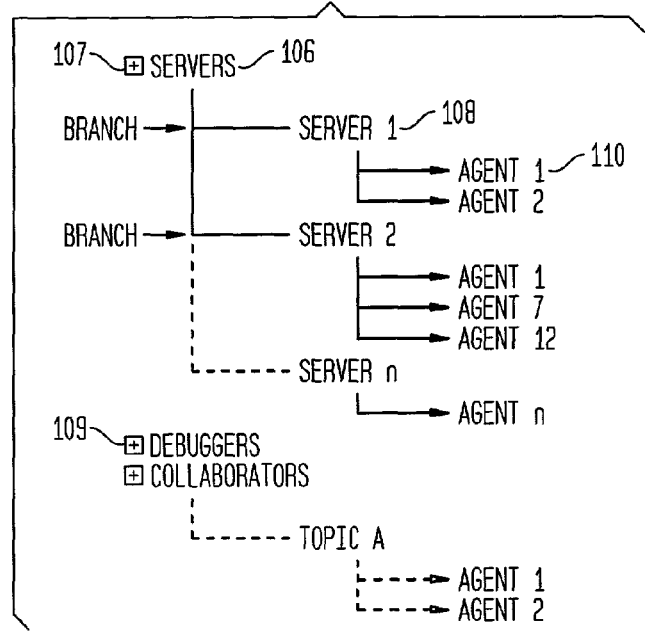
FIG. 4 is a hierarchical diagram showing the user interface for management consoles of the present invention.

FIG. 4 is a diagram of screen layout graphically depicting all available servers within the present invention. The leftmost column 106 of the graphical interface represents the core components within the system. Listed in this column are component names, such as, "Servers," "Debuggers," and "Collaborators." Through a mouse-driven graphical user interface, a user of the management console will be able to click on a small icon containing a plus sign 109 to the left of the component designation. This action will cause the selection to expand so that more detailed information for that particular component can be displayed.

Icon 107 to the left of leftmost column 106 in the diagram is depicted as having already been clicked by a user, so that detailed information for "Servers" is now displayed. The second column 108 displays more detailed information for a specific component. It is to be understood that second column 108 can display, but is not limited to, information about a plurality of components of the invention, such as server names, collaboration subsystem names, topics of conversation, and active debuggers. Last column 110 provides the user with the most finely-grained information about a given subsystem. For example, last column 110 could display the names of agents running on a given server, agents being monitored by the debugger, or agents involved in a given topic of conversation. As soon as an agent listed in last column 110 completes execution, it is removed from last column 110.

Figure 4A:
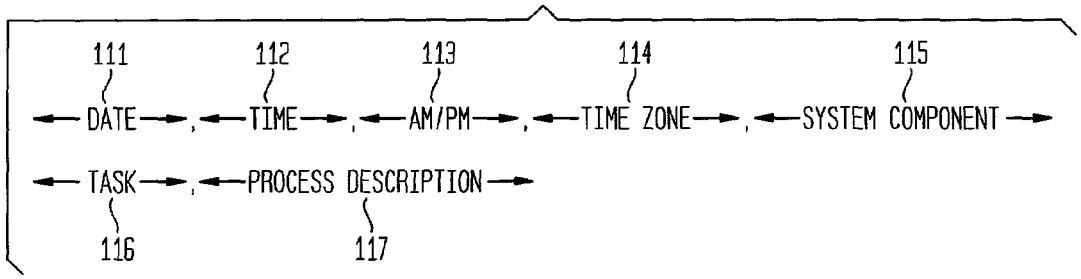
FIG. 4a is a diagram showing log file formats of the present invention.

FIG. 4a depicts the physical log file format used by the agent server of the present invention to store information in real time. The first field 111 stores the current date. The second field 112 stores the current time and is comprised of two-digit values corresponding to hours, minutes, seconds, and milliseconds. The third field 113 indicates whether the time is AM or PM. The fourth field 114 is a three-character representation of the time zone. The fifth field 115 stores the name of the system component that is writing the log entry, for example "server." The sixth field 116 represents the task that is presently being performed, such as agent creation or deletion. The seventh field 117 is a brief textual description of an event that has taken place. In a preferred embodiment of the invention, an agent server logs all events on behalf of all other active servers.

Figure 5:
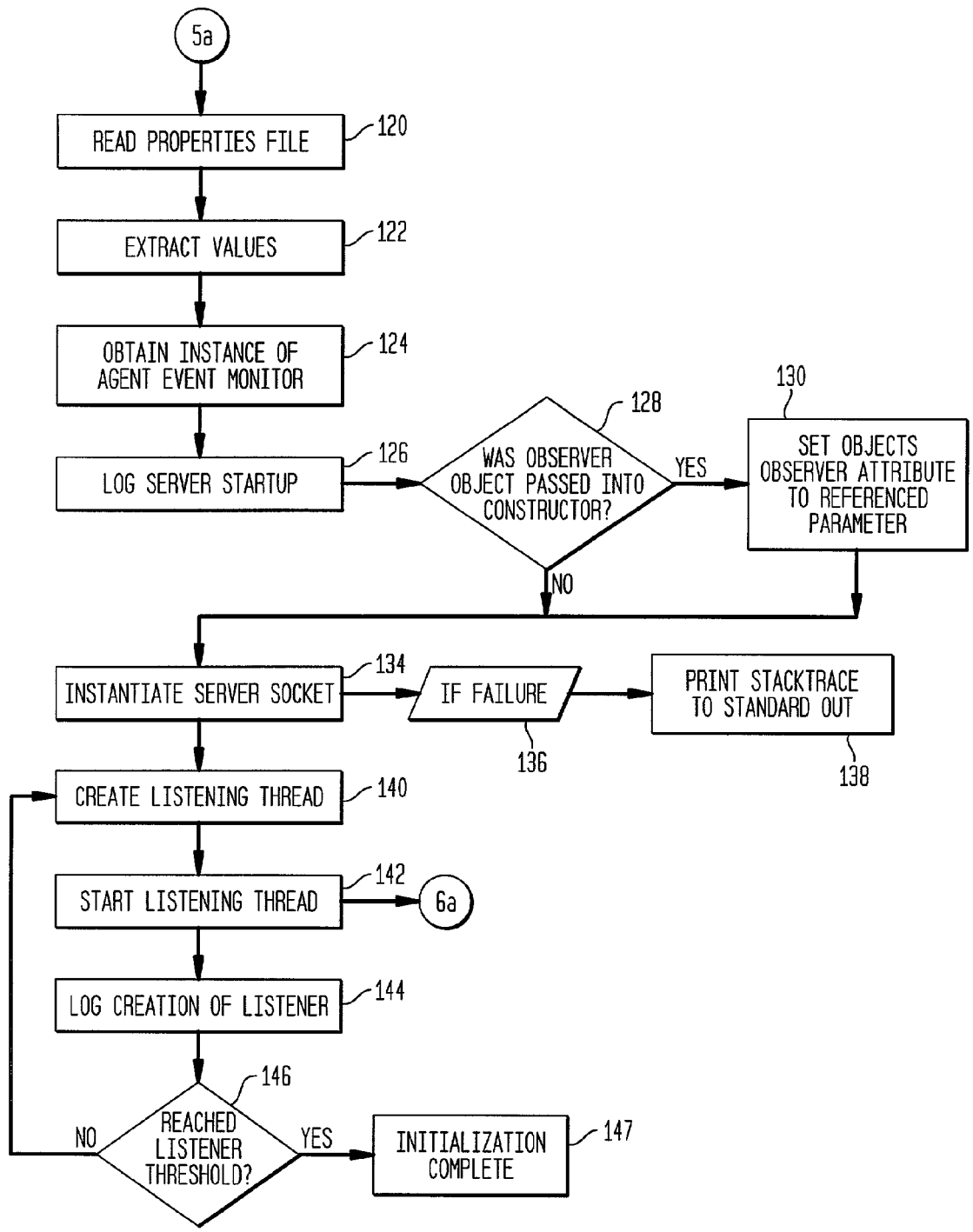
FIG. 5 is a flowchart showing initialization of the agent server of the present invention.

FIG. 5 is a flowchart showing processes for initializing an agent server of the present invention. In step 120, a disk-based properties file is read. Key values are extracted in step 122, such as the port number to listen to or the number of threads to place into a pool awaiting connection. In step 124, an instance of the agent event monitor is created. An entry is then written into the physical log file in step 126 using the format described in FIG. 4a. At step 128 a decision point is reached. If an observer object is passed into the server's constructor, then the observer member attribute of the agent server will be set in step 130. This member attribute is set by step 130 directly via a call to the addObserver( ) method within the ancestor. A server socket is then instantiated in step 134. If failures are detected in step 136, a stack trace is sent in step 138 to the standard out. Once a server socket is initiated by step 134, a listening thread is created in step 140, and then started in step 142.

Upon completion, step 142 invokes step 144, wherein the creation of a listening thread is logged. A decision is then made in step 146. If the number of threads created is below a threshold determined by step 120, step 146 re-invokes step 140, where additional listening threads are created. If the listener threshold has been met, execution is completed in step 147.

Importantly, the architecture of the server allows each listening thread that is spawned to share a reference to a single server socket. This allows a connection to be made from a pool of existing listeners, rather than by directly spawning a separate thread for each accepted client connection. This provides for a more stable, high-performance server, and eliminates the need for the Java virtual machine to constantly perform garbage collection on discarded connection threads. The term "garbage collection" is widely known within the object-oriented programming art, and refers generally to processes invoked by a virtual machine to free memory and other computing resources that are no longer being used.

Figure 6:
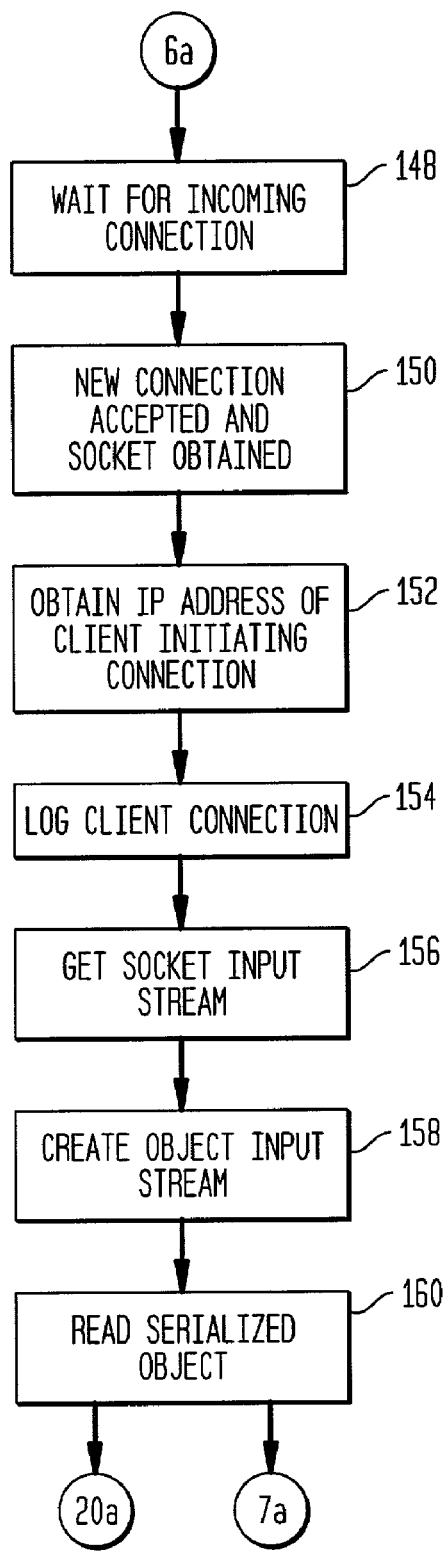
FIG. 6 is a flowchart showing client connection acceptance procedures of the agent server of the present invention.

FIG. 6 depicts a flow of events relating to an agent server accepting a client connection. In step 148, the agent server waits for an incoming client connection. When the agent server accepts an incoming connection, a client socket is created in step 150. Because there is a pool of listening threads, each of which may be busy, a connection request may remain in a pending state for a period of time, awaiting for a listening thread to be freed. Such a function is inherent in Java's socket based libraries and not part of the present invention. In step 152, the IP address of the client initiating the connection is obtained. Then in step 154, the establishment of a connection is logged. In step 156 a socket input stream is acquired. From the socket input stream, an object input stream is created in step 158. An attempt is then made in step 160 to read a serialized object. With this methodology, the invention takes full advantage of the standard object serialization methodologies inherent in the Java programming language.

Figure 7:
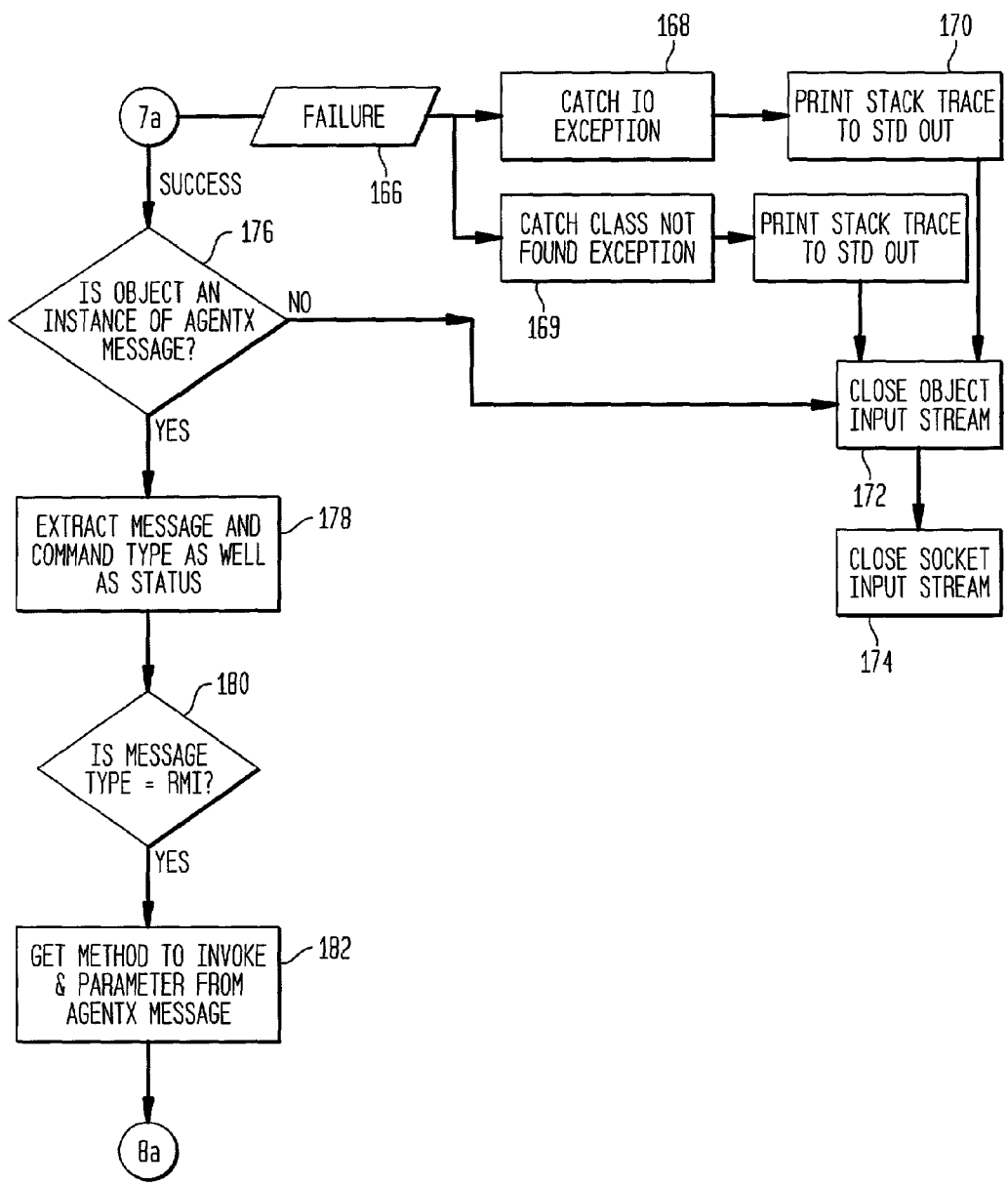
FIG. 7 is a flowchart showing generic processing of agent messages containing RMI requests by the agent server of the present invention.

FIG. 7 is a flowchart showing agent server processing of an agent message which contains an RMI request. An agent message in this system is a serializable object that passes information between servers. Such information may relate to many different processes described in various flows, and may include, but is not limited to, the identification of operations to carry out remotely, status information, completion, state information, and error-related data.

Beginning in step 166, a failure is detected during the attempt to read a serialized object. If a failure is detected in step 166, either an IOException 168 or a ClassNotFoundException 169 is caught. A stack trace is then sent to the standard output in step 170. Then, the object input stream is closed in step 172, and in step 174, the socket input stream is closed.

If no exception is thrown while reading the serialized object, a decision point is reached. In step 176, a test is performed to see if the object is an agent message. If it is, then step 178 is executed, wherein the command type and status of the agent are extracted If the object is not an agent message, step 172 is executed. Once the command type and status of the agent are extracted in step 178, another decision point is reached in step 180, and a check is made to see if the message type is equal to "RMI." If so, execution proceeds to step 182, where the method to invoke and method parameters are obtained from the message.

Figure 8:
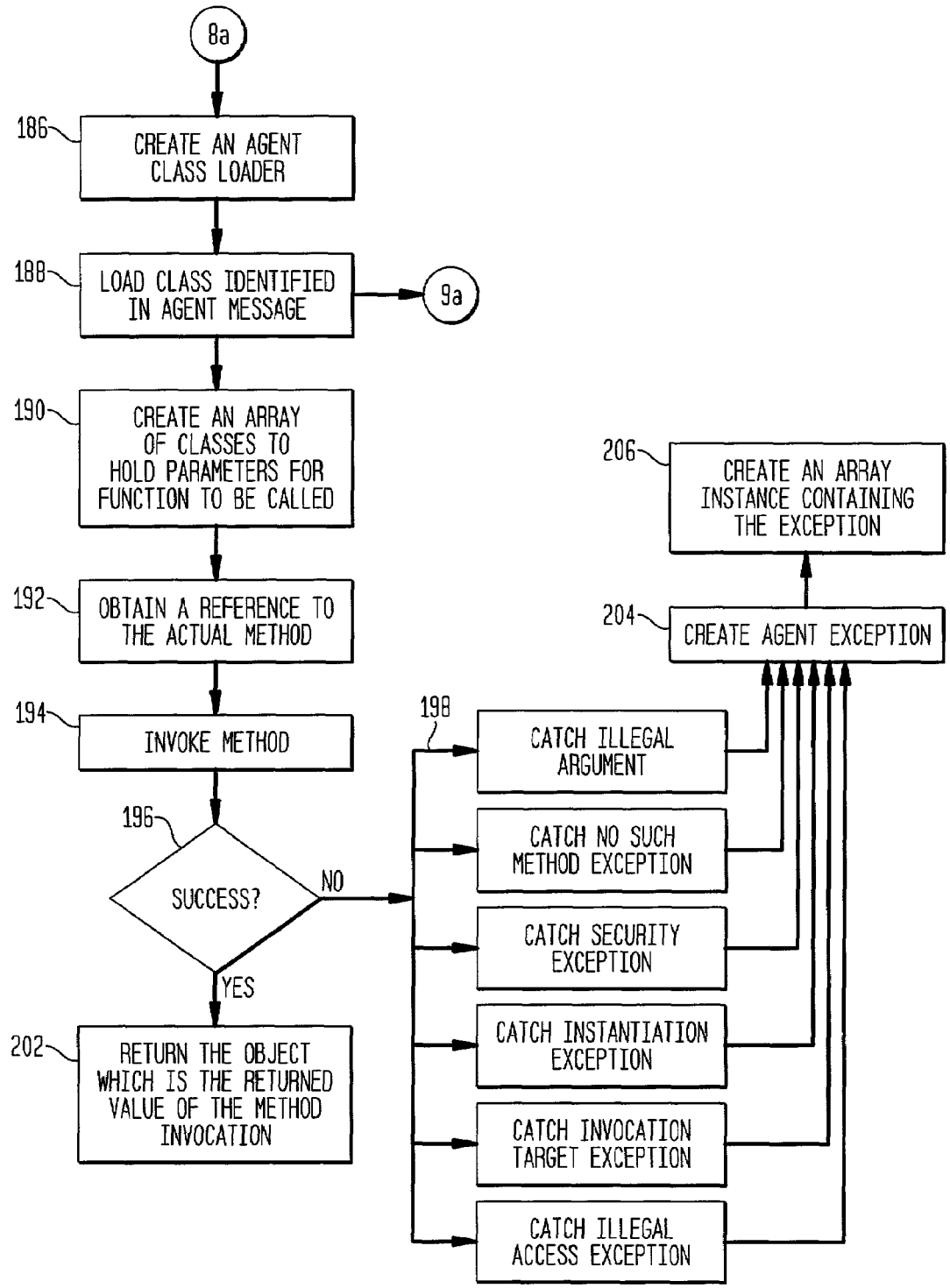
FIG. 8 is a flowchart showing generic server processing of an agent message RMI request.

FIG. 8 depicts a flow of events relating to invoking of a method within a server resulting from an RMI request from another server. In step 186, an agent class loader is created. Then, in step 188, a class identified within the agent message is loaded. Next, an array of class objects is instantiated in step 190 to hold all of the parameters that the method requires. A reference to the actual method is then obtained in step 192. The method is finally invoked in step 194. At decision point 196 successful invocation of the method is determined. If the method was successfully invoked, then the return value from the call to the method is passed back in step 202. If the invocation failed, an exception is caught in step 198. The caught exception may be one of many possible types, including the passage of an illegal argument, non-existence of the requested method within the specified object, or failure to create the object. If an exception is caught, the agent server in step 204 will create a specific instance of an agent exception. The newly-created agent exception will be placed within an array object and passed back to the calling method in step 206.

Figure 9:
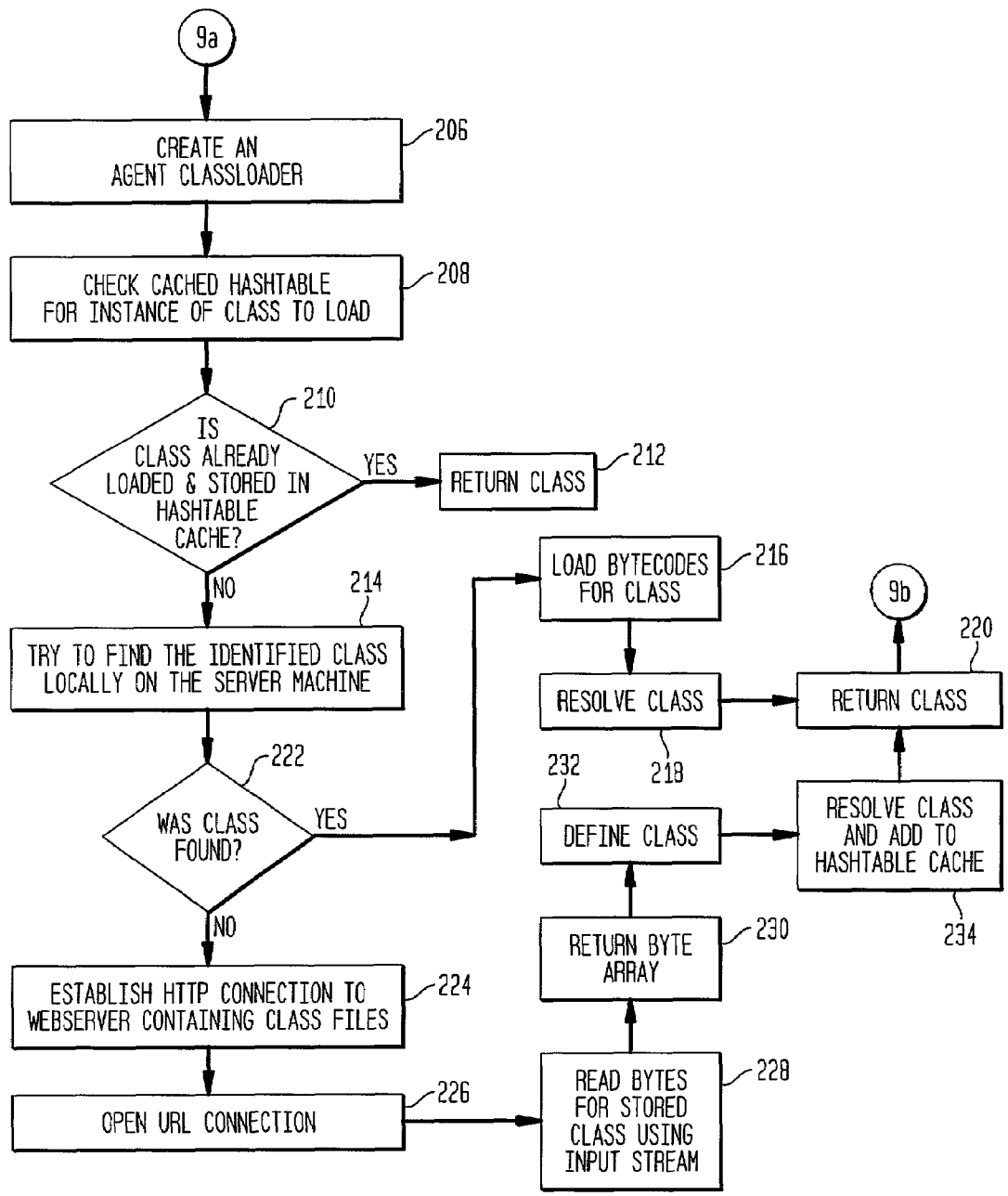
FIG. 9 is a flowchart showing the custom class loader of the present invention.

FIG. 9 is a flowchart showing a custom network-based class loading mechanism used by the present invention to dynamically load mobile agent class files from a standard web server located on a network. In step 206 an instance of an agent class loader is created, and is derived from the ClassLoader class included in the Java language. In step 208, a check is performed to see if an instance of that class is stored in the cached hash table storing agents that have already executed on the machine. A decision point is then reached in step 210 to determine if an instance of the class is stored in the hash table. If so, then the instance is returned to the calling method in step 212. Alternatively, in step 214, the agent class loader then attempts to find the class locally on the machine on which it is running.

If the class is found in step 222, bytecodes are loaded from the local file system in step 216. The class is then resolved in step 218. During the process of resolving a class, the Java virtual machine will ascertain all of the dependent classes for the one currently being loaded. The virtual machine will then automatically call the loadClass method within the agent class loader for all dependent classes.

If the class is not found in step 222, then an attempt is made in step 224 to establish an HTTP connection to a web server containing the mobile agent and dependent class files. In step 226, the connection to the remote web server is opened for reading. Step 226 then invokes step 228, whereby the bytes representing the desired class are read via an input stream. The byte array is then returned to the calling method in step 230, and in step 232, an array of bytes is converted into a Java class object. In step 234, the class is resolved and a reference to it is placed in the cached hash table of agents. Finally, in step 220 the class itself is returned to the calling method.

Figure 10:
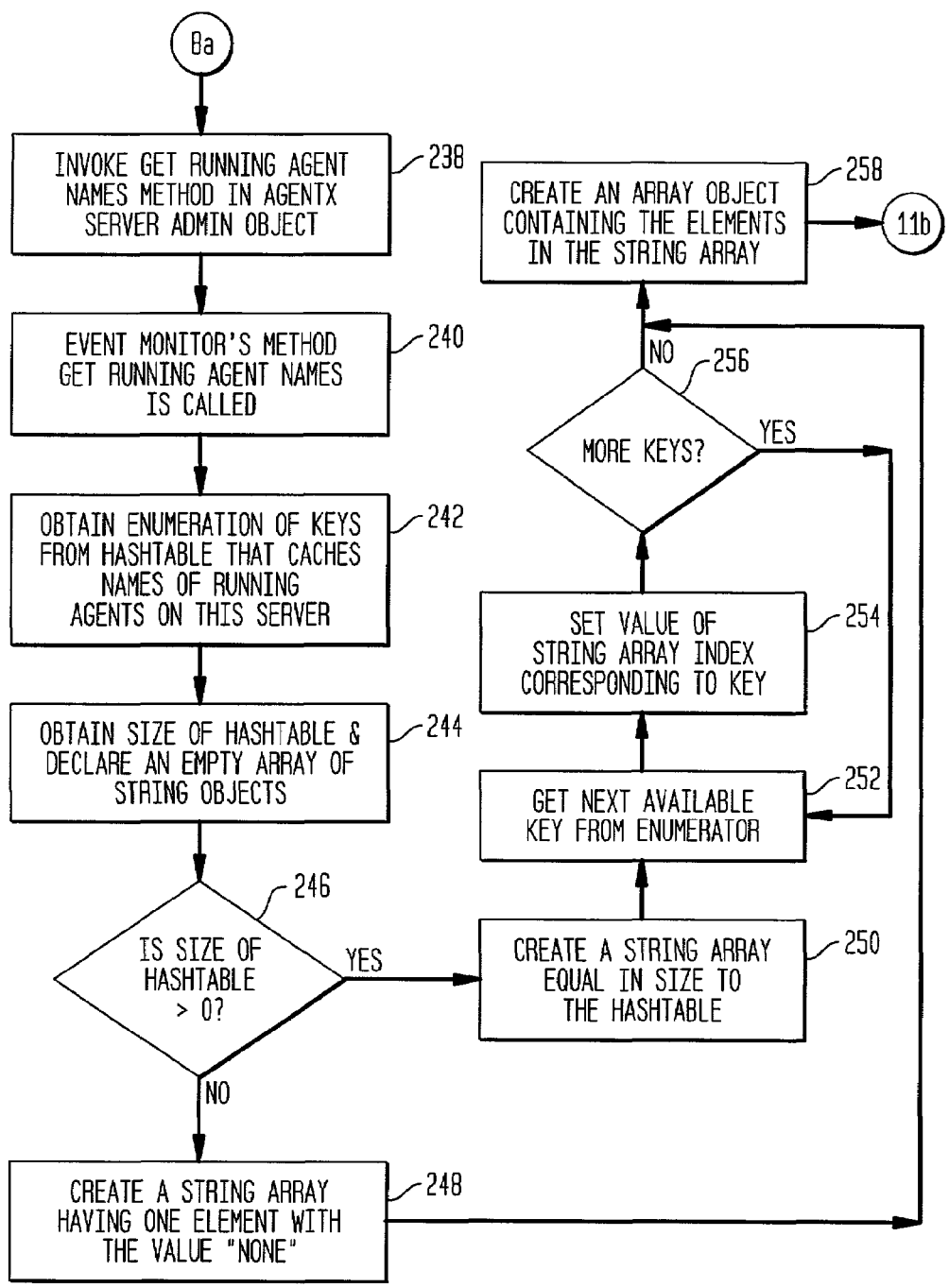
FIG. 10 is a flowchart showing agent server processes for handling RMI requests to obtain lists of running agents.

FIG. 10 is a flowchart showing the processing of an RMI request made to an agent server to obtain the names of all running agents on that machine. In step 238, the method getRunningAgentNames within the agent server admin object is called. That method in turn invokes a method in the event monitor object in step 240. Then, in step 242, a helper function returns an enumeration representing the keys of a hash table containing references to the actual agent threads that are running on the server machine. The enumeration of key values are the names of the running agents. The next step, 244, obtains the size of the running agent hash table and creates an empty string array. A decision is made in step 246 to determine whether the size of the hash table is greater than zero. If the size of the hash table is greater than zero, then processing continues to step 250, where an array of Strings are dimensioned equal in size to the hash table. Then, the next available key from the enumeration is obtained in step 252. After obtaining the next available key from the enumeration, a value is set in the String array in step 254, representing the agent's name. Another decision point is then reached in step 256 to determine if more elements exist in the enumeration. If there are more keys, step 252 is re-invoked by step 256. If no more keys are available, then an array object containing the elements of the String array is created in step 258.

If, in step 246, the size of the hash table is determined to be equal to zero, then a String array with a dimension of one is created in step 248 and the value set to the word "none." After setting the value for this array step 248 then invokes step 258.

Figure 11:
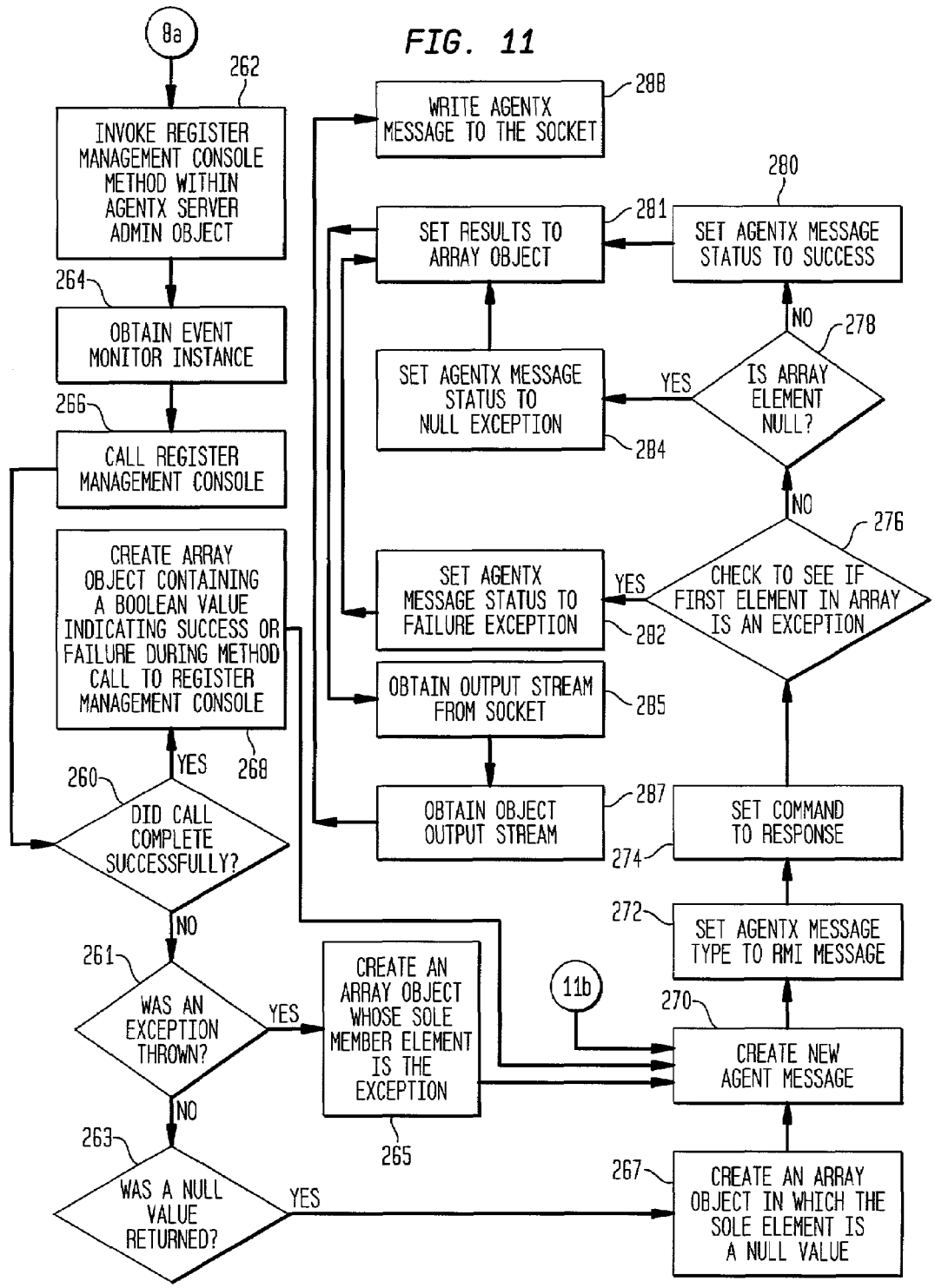
FIG. 11 is a flowchart showing management console registration processes.

FIG. 11 depicts the processing of an RMI request to register the management console. In step 262 a method is called with the agent server admin object to register the management console. Next, an object event monitor instance is acquired in step 264. A method in the event monitor component is then called in step 266 to register a management console. In step 260 a check is performed to determine whether the previous call completed. If the call did complete, an array object containing a boolean value indicating the success or failure of the preceding operation is created in step 268. If the call did not complete, a check is performed in step 261 to see if an exception was thrown. If an exception was thrown, an array object is created in step 265, whose only member element is the thrown exception. If an exception was not thrown, a determination is made in step 263 as to whether the operation returned a null value. If so, then an array object having a null member element is instantiated in step 267.

After the array object is created in either steps 268, 265, or 267, a new agent message is instantiated in step 270. The message object will be used to send back the result to the management console. After this action takes place, the message type is set to "RMI" in step 272, and the command is set to "Response" in step 274. In step 276 a decision point is reached and a check is made to see if the first element in the array object is an exception. If so, step 276 invokes step 282, and the agent message status is set to "Failure Exception." Alternatively, check is made in step 278 to see if the first array element is null. If the first array element is null, then execution moves on to step 284, where the agent message status is set to "Null Exception." If the result is negative for the decisions made in steps 276 and 278, then in step 280, the agent message status is set to "Success." After the agent message status is set in either steps 280, 284, or 282, execution continues at step 286, where the results data attribute within the agent message is set to the array object. Then, in step 285, an output stream is created from the server side socket. An object output stream is created in step 287, and in step 288, the serializable agent message is written to the object output stream.

Figure 12:
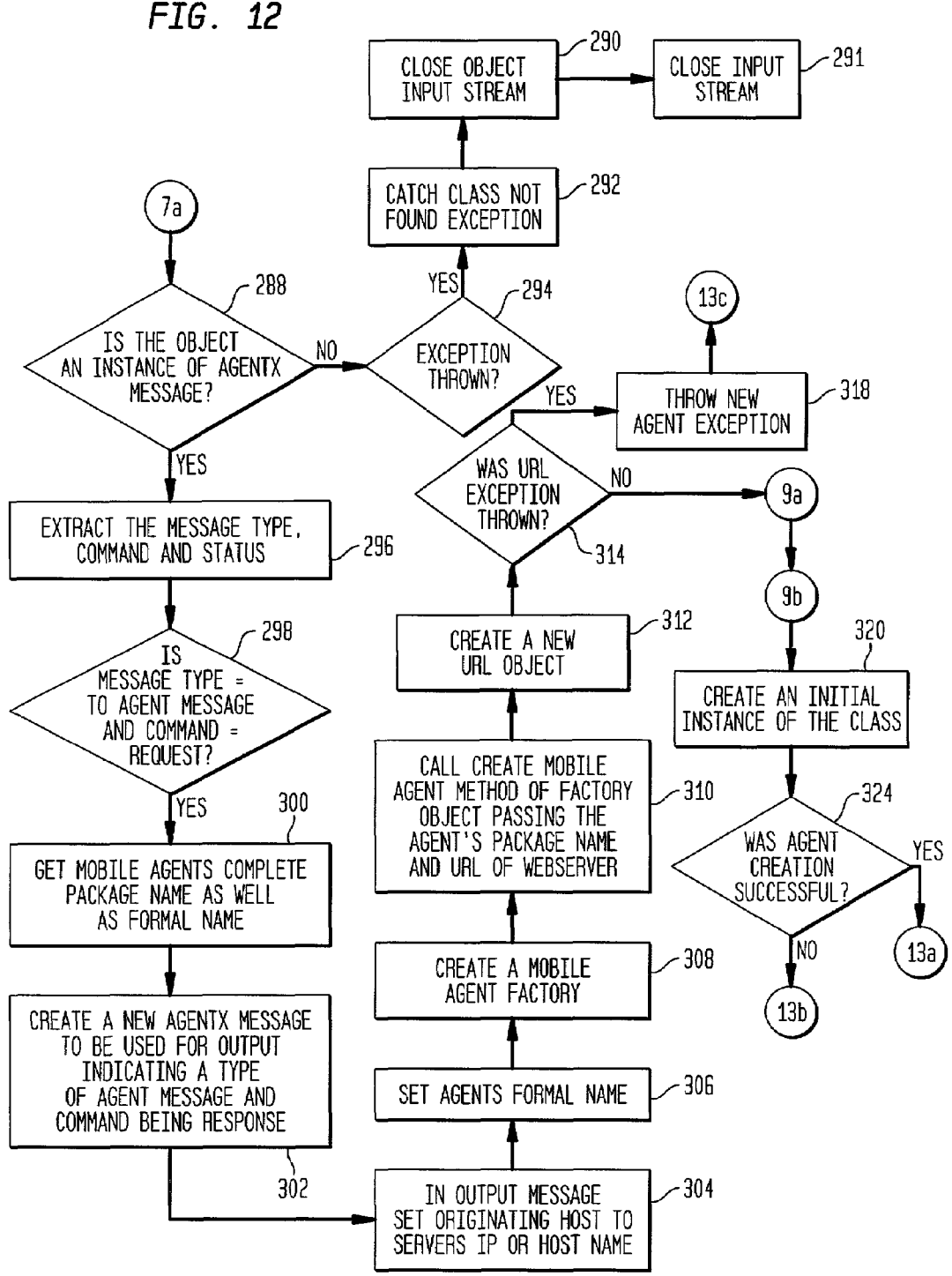
FIGS. 12, 13, 14 are flowcharts showing generic processing of a request to launch a mobile agent.

FIG. 12 is a flowchart showing a server processing a request to launch a mobile agent. In step 288 a test is made to see if the object read is an instance of an agent message. If the result is negative, a check is performed in step 294 to determine if an exception was thrown. If an exception was thrown, then the class not found exception is caught in step 292. The object input stream is closed in step 290 and in step 291 the input stream is closed. If the read object performed in step 288 returns an agent message, then processing continues to step 296, where the message type, command, and status values are extracted. In step 298, a decision point is reached and a check is made to see if the message type is equal to "agent message" and command is equal to "request." If these tests are both true, then step 300, retrieves the agent's complete package name as well as its formal name.

In step 302, a new agent message is created which will be used to send a status response back to the remote calling process. Then, in step 304, the originating host value is set to the server's IP address or host name within the response. In step 306, the agent's formal name is set, and in step 308, a mobile agent factory is created. In step 310, the create mobile agent facility is called within the factory object passing control to that method. Step 312 creates a new URL object. A test is made in step 314 to see if a MalformedURLException was thrown. If so, in step 318 it is caught and a new agent exception is created and thrown. If a MalformedURLException was not thrown, processing proceeds through the steps previously described in the detailed explanation of FIG. 9. Upon returning, execution continues in step in 320, wherein an initial instance of the class is created. If the creation of the mobile agent is determined to be successful in step 324, then execution continues as per the sequence of events described in below and depicted in FIG. 13.

Figure 13:
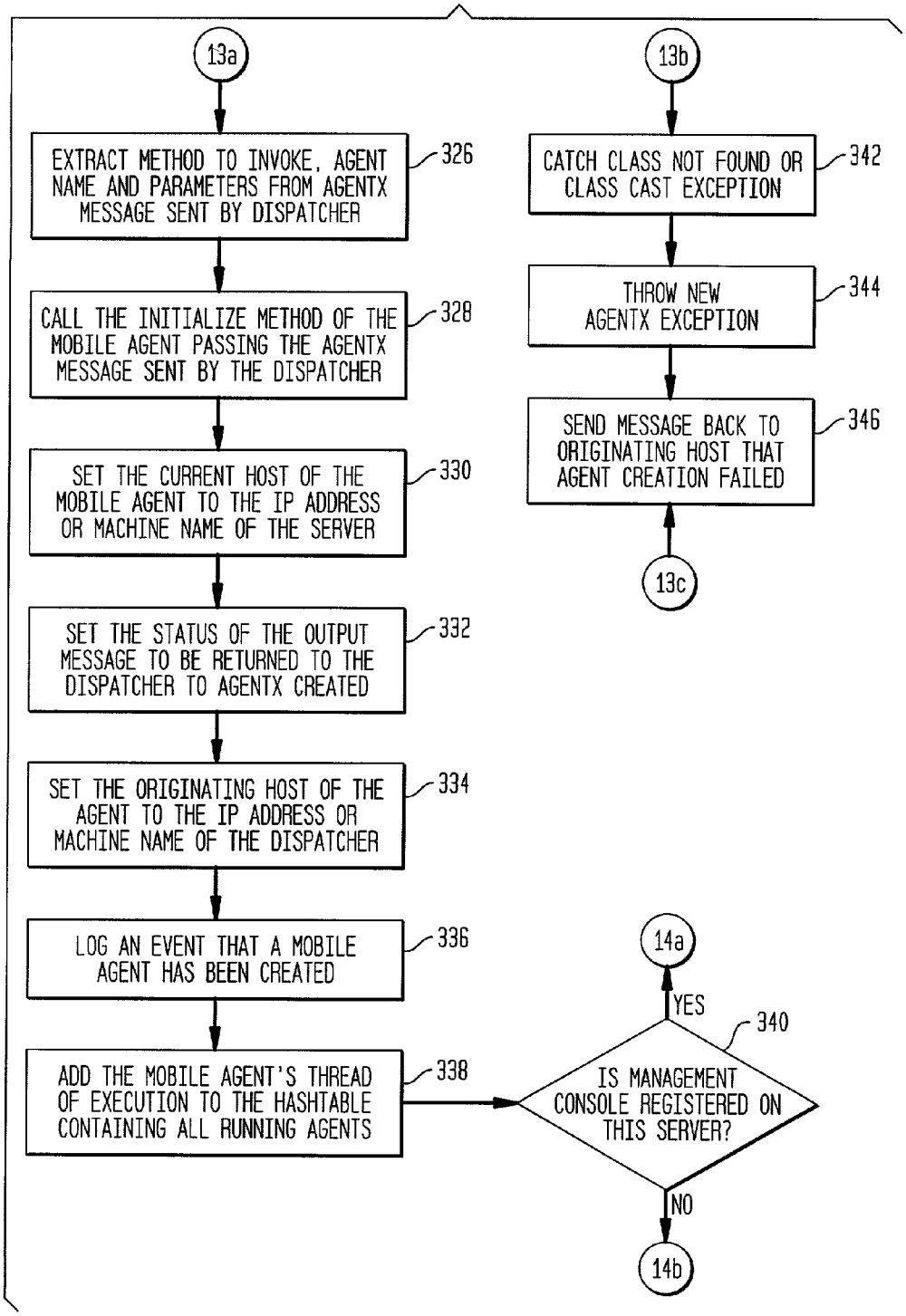

FIG. 13 is a flowchart showing further processes to launch a mobile agent. Sequence 13a begins with step 326 whereby the agent name is extracted, in addition to the method to invoke and parameters from the agent message sent by the dispatcher. In step 328 the initialize method of the mobile agent is called, passing to it the agent message sent by the dispatcher. Next the current host of the mobile agent is set to the IP address or machine name of the in step 330. Then in step 332, the status of the output message to be returned is set to the dispatcher the agent created. In step 334, the originating host of the agent message is set to the IP address or machine name of the remote dispatcher. An event is logged in step 336, indicating that a mobile agent has been created. In step 338, the mobile agent's thread of execution is added to the hash table containing all running agents. To complete the process, a check is performed in step 340 to see if the management console is registered on this server. If it is, program execution continues with sequence 14a in shown in FIG. 14; otherwise, sequence 14b in FIG. 14 is called.

Sequence 13b in FIG. 13 begins in step 342 by catching a class not found exception. Once this occurs a new agent exception is created and thrown in step 344. Processing continues in step 346 by sending back a message to the originating host that agent creation failed.

Figure 14:
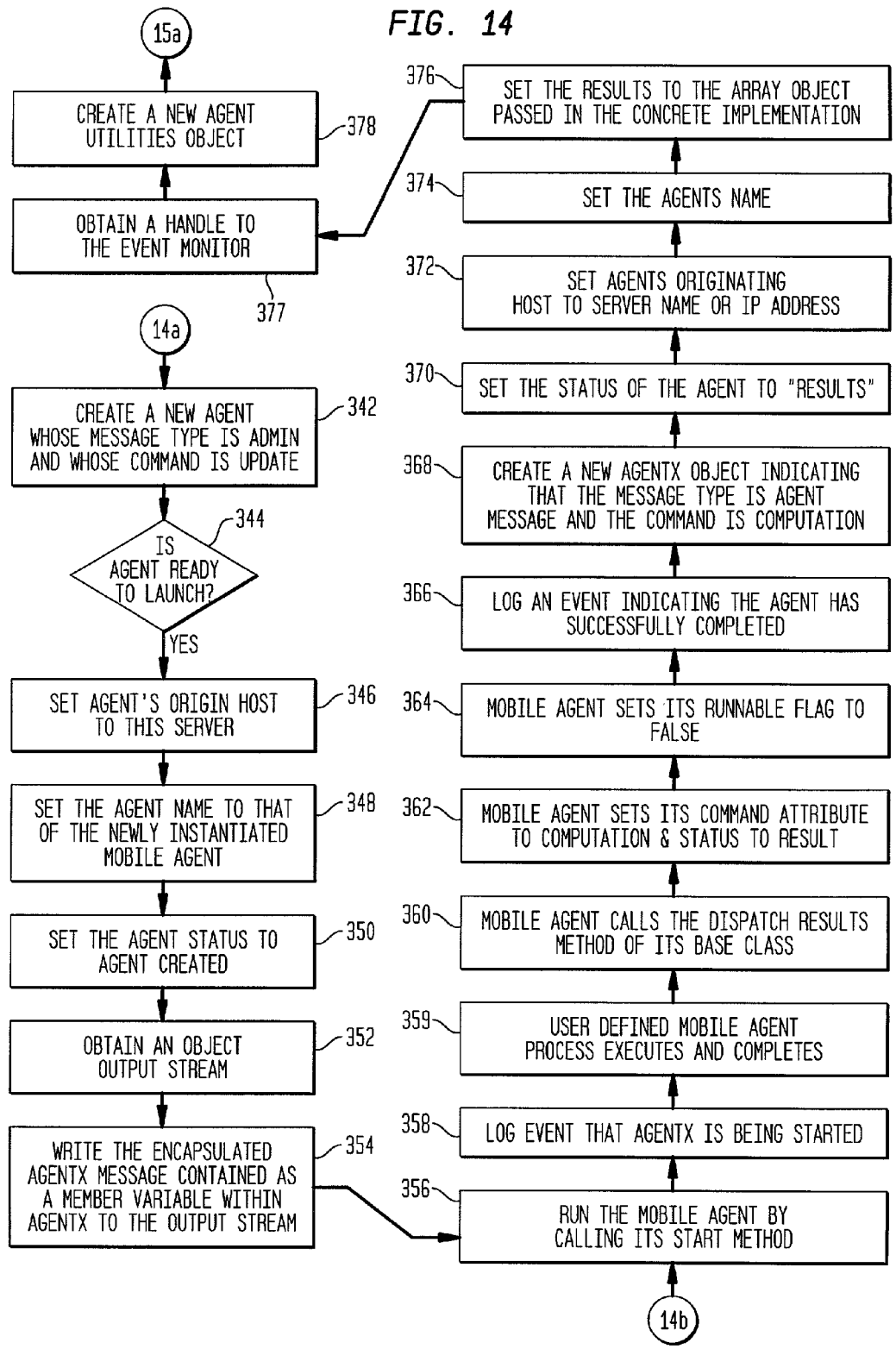

FIG. 14 is a flowchart showing continued processing for launching a new mobile agent. Sequence 14a begins with the creation in step 342 of an agent object whose message type is "admin," target host is the admin console, and command is "update." Step 344 checks to see if the agent is ready to launch If so, the next operation to execute is set, in step 346, from the agent's origin host to this particular server. Next, in step 348, the agent name is set to that of the newly instantiated mobile agent. Also, in step 350, the agent status attribute is set to "Agent Created." In step 352 an object output stream is obtained. In step 354 the agent message attribute of the agent object is set to the message that was created previously in step 302. The send server update method of the agent object is called, which in turn writes the message to the object output stream it establishes with the server running the console.

Sequence 14b, beginning in step 356, starts the mobile agent. In step 358 an event is written to the log file indicating that an agent is being started. Next, in step 359, the user-defined mobile agent process executes and completes. In step 360, the mobile agent calls the DispatchResults( ) method of its base class. It passes in as a parameter the computational results of its efforts, which are then encapsulated as an Array object. In step 362, the mobile agent sets the values, within its agent message attribute, of command to "computation" and status to "result." Execution then continues to step 364, where the mobile agent sets its runable flag to "false." In step 366, an event is written into the log file indicating that the agent has successfully completed. In the next step 368, a new agent object is created. Its underlying message type is set to "agent message" and the command is set to "computation." In step 370, the status of the agent is set to "results." Then, in step 372, the originating host value is set to either the server name or IP address on which it just executed. In step 374, the agent's name is set to the name of the mobile agent that just completed execution. In step 376, the results attribute within the DispatchResults( ) method call, implemented within the abstract ancestor of the mobile agent, is expressly set to the Array object passed in as a parameter to the method call. In step 377, a handle to the event monitor is obtained. Finally, in step 378, a new agent utilities object is created. From that point on control passes to sequence 15a shown in FIG. 15.

Figure 15:
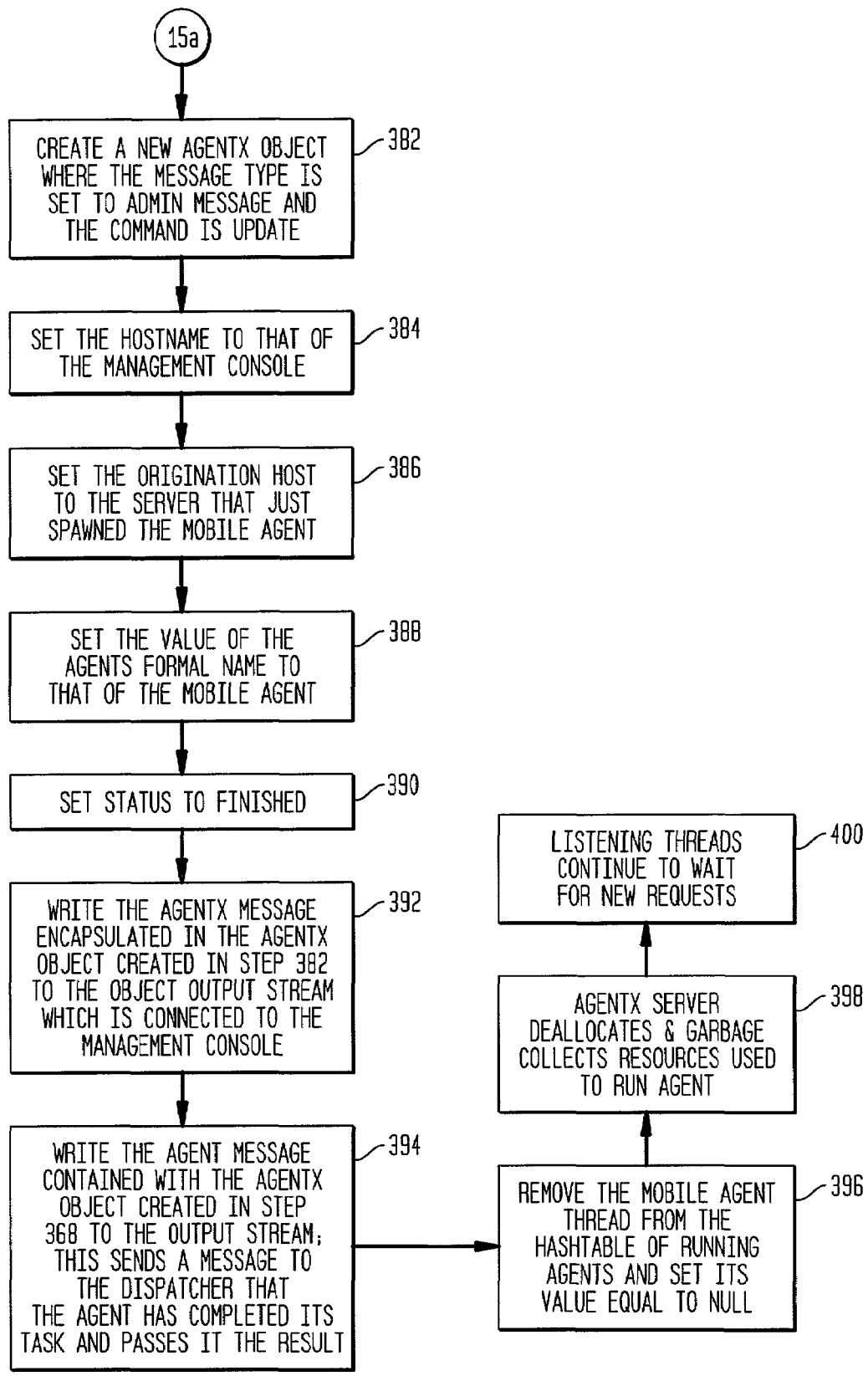
FIG. 15 is a flowchart showing generic processing of a request to launch a mobile agent notifying the management console and dispatcher.

FIG. 15 is a flowchart showing the processing of a request to launch a mobile agent. Sequence 15a begins with step 382, wherein a new agent object is created, the message type is set to "administration message," and the command is set to "update." In step 384, the hostname is set to that of the management console. In step 386 the origination host is set to the server that spawned the mobile agent. Then, in step 388, the value for the name of the mobile agent that finished execution is set. In step 390 the status is set to "finished." Step 390 then invokes step 392, wherein the agent message encapsulated within the agent object is written to the object output stream and is read at the server running the management console. After that process completes, another agent message contained within the agent object created in step 368 is written to the object output stream in step 394. This process sends a message to the agent dispatcher indicating that a specific mobile agent has successfully completed its task and has returned a result. Then, in step 396, the server removes the completed mobile agent form the cached hash table of running agents. Its value is then set to null so that it may be garbage-collected by the Java virtual machine in step 398. Finally, the server thread, having completely finished processing, is returned into the free pool and waits another connection request from a remote server in step 400.

Figure 16:
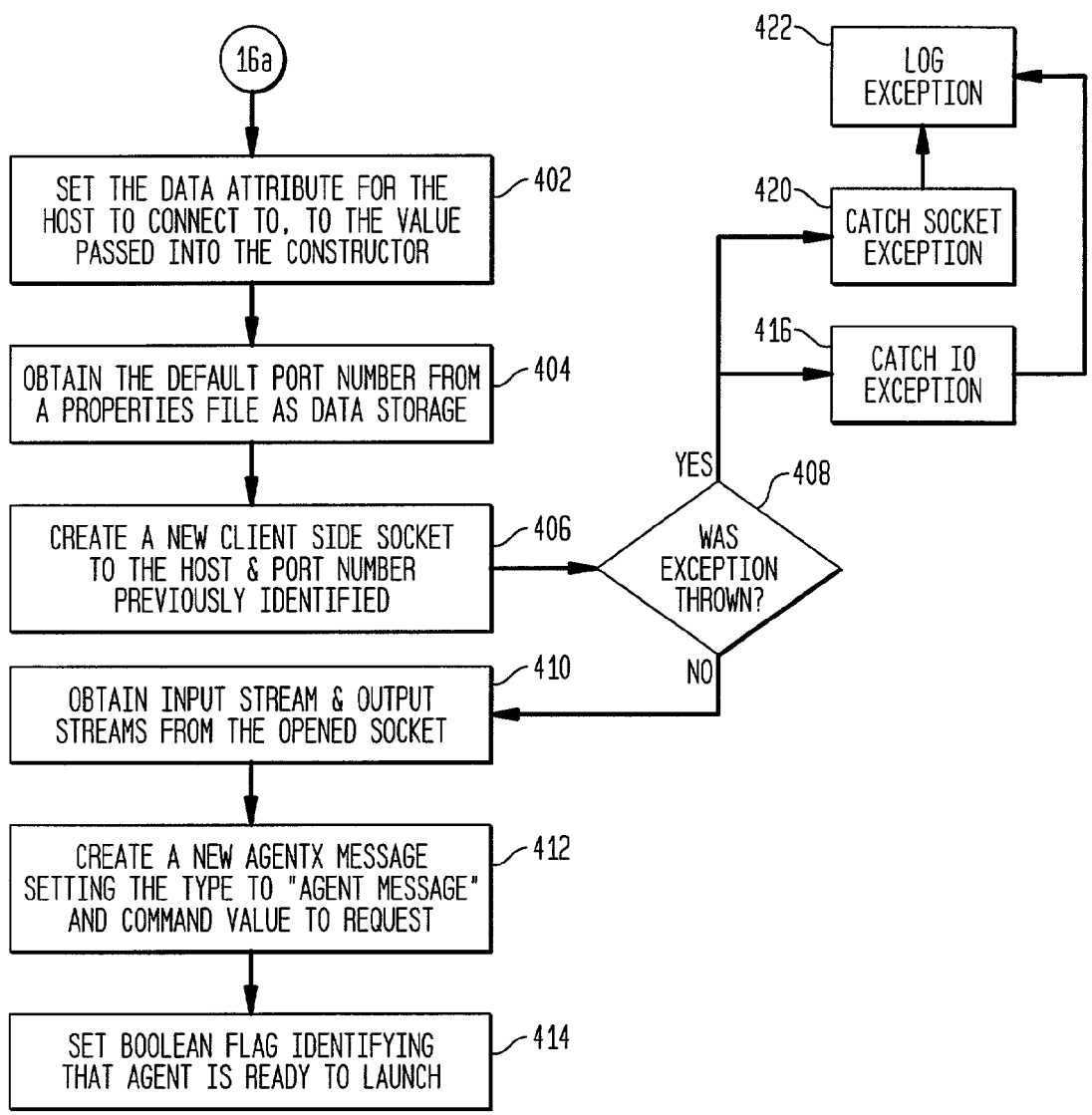
FIG. 16 is a flowchart showing processes for creating an agent object.

FIG. 16 is a flowchart depicting the generic creation of an agent object. In step 402, the member attribute for the remote host is set to the value passed into the object when its constructor is called. Then, in step 404, the default port number is obtained by reading a disk-based properties file. In step 406, a new client side socket is created and connected to the host and port number specified. In step 408, a decision point is reached, wherein a test is performed to see if an exception was thrown. If an exception was thrown, step 408 invokes steps 416 and 420, wherein the two most likely exceptions, IOException and SocketException, are caught. After the exceptions are caught they are written to the log file in step 422. If an exception is not thrown, then processing continues in step 410, where both an input and output stream is obtained from the opened socket. In step 412, a new agent message object is created, the type is set to "agent message," and the command set to "request." Finally, in step 414, a boolean flag is set to true, indicating that the agent is ready to be launched.

Figure 17:
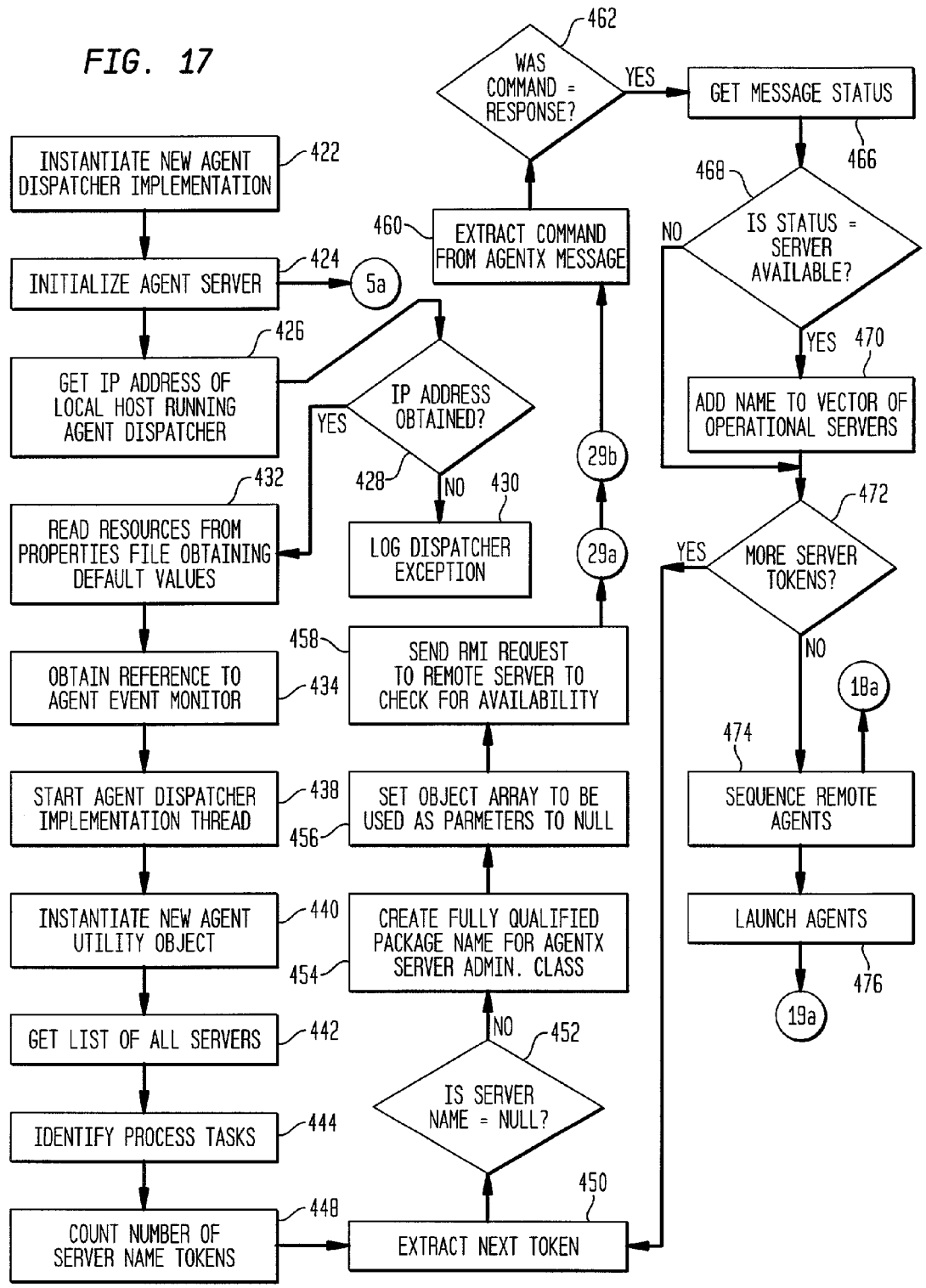
FIG. 17 is a flowchart showing processes for creating an agent dispatcher.

FIG. 17 is a flowchart detailing the process of creating an agent dispatcher. The process begins at step 422, wherein a new agent dispatcher implementation is instantiated. In step 424, an agent server is created and initialized in the manner depicted and described in FIG. 5. Then, in step 426, the IP address of the local host running the agent dispatcher and server is obtained. In step 428, a test is performed to determine if the IP address was successfully obtained. If an IP address was not successfully obtained, then execution proceeds to step 430 where an exception is logged. If the IP address was obtained, then resource information is read from a properties file in step 432. Then, in step 434, a reference is obtained to an agent event monitor In the following step 438, the concrete agent dispatcher thread is started. Then, in step 440, an instance of an agent utilities object is created.

In step 442, a list of potential servers is obtained. In step 444, actual process tasks that need to be carried out are identified. Then, in step 448, the number of server tokens is counted. In step 450, the next available token from the list is extracted. A decision point is reached and the token, which represents a server name, is compared to a null value in step 452. In step 454, a fully qualified Java package name is created for the agent server admin class. The following step, 456, sets the array to be used as the agent message parameter attribute to null. In step 458 an RMI request is sent to the remote server to check for process availability. When this call is made, the program on the initiating server running the agent dispatcher waits until a response is sent from the remote server indicating its availability. Sequences 29a through 29b are then invoked, the functioning of which are described in detail below. Once the response is received from the remote server, execution continues at step 460 and the command value is extracted from the agent message read via the object input stream on the server running the agent dispatcher. A decision point is then reached in step 462, and the command value is tested to see if it equals the response. If so, step 466 is invoked, wherein the status of the message is acquired. In step 468 a test is performed to see if the status is equal to the server available. If the server is available, its name is added to the vector of operational servers in step 470, and then control continues at step 472, wherein another decision point determines whether there are more server tokens. If the server is not available, control passes to step 472. When no more server tokens are available, then execution continues at step 474, in which the sequencing of remote agents takes place. Finally, agents are launched in step 476.

Figure 18:
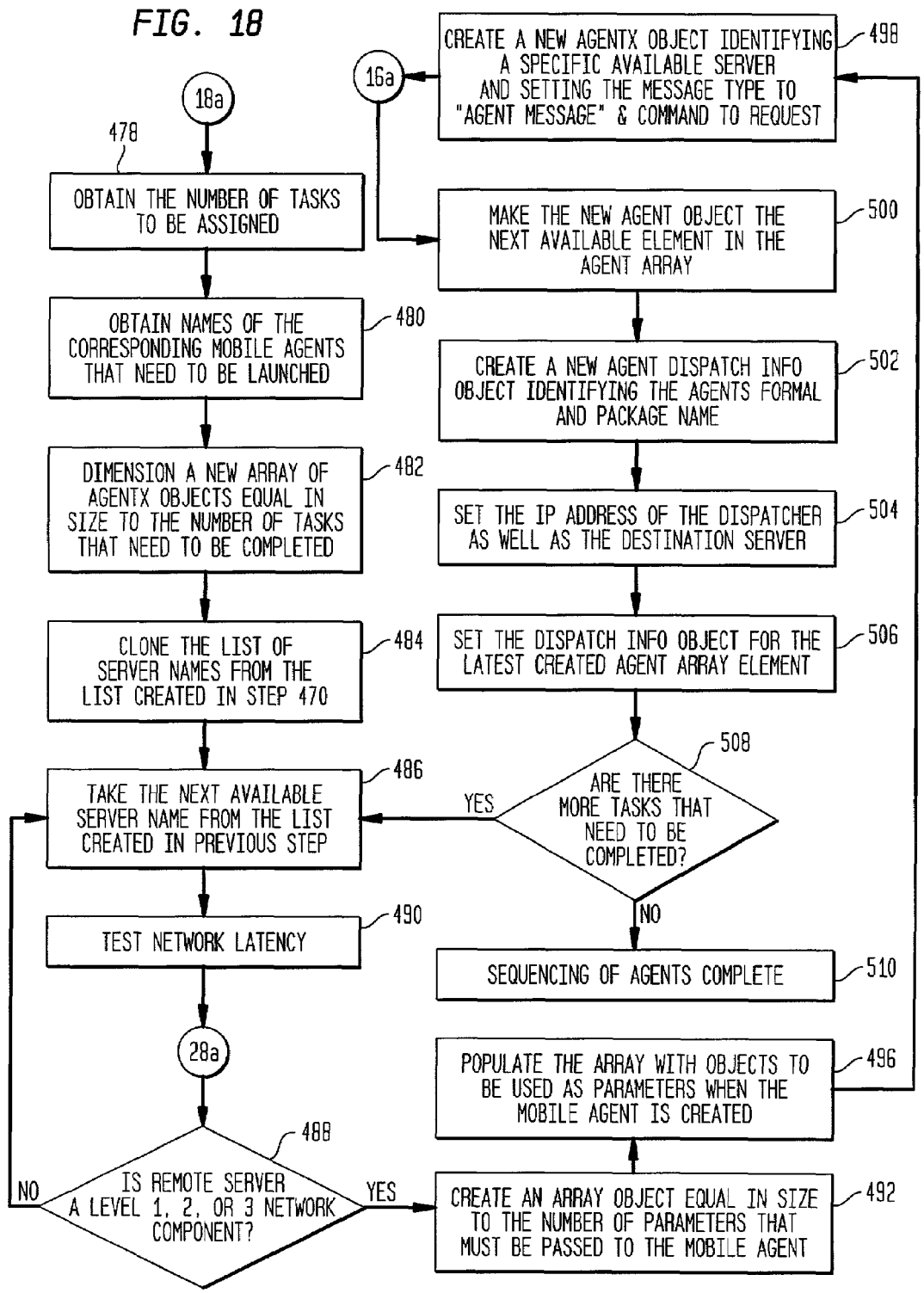
FIG. 18 is a flowchart showing processes for sequencing remote agents.

FIG. 18 is a flowchart showing the sequencing of remote agents prior to being launched. Beginning in step 478, the number of tasks to be assigned is obtained. Then, in step 480, the names of the corresponding mobile agents that need to be launched are obtained. In step 482 an array of mobile agent objects equal in size to the number of tasks to be assigned is dimensioned. In step 484, the list of available servers created through the reiteration of step 470 is cloned. The next available server name is then determined in step 486. In step 490, the system performs a series of steps to ascertain network latency. These steps are described in detail in sequence 28a of FIG. 28. Upon returning from sequence 28a, a decision point is reached in step 488. A test is performed to see if the remote server is a level one, two or three network component. If the server is one of these three, execution continues in step 492. If the server is not a level one, two, or three network component, control passes back to step 486. Assuming the server is a level one, two or three network component, an array for storing objects is created equal in size to the number of parameters that must be passed to the mobile agent. In step 496 the array is populated with objects to be used as parameters when the mobile agent is created on the remote machine. Following this action a new agent object is created in step 498. This agent identifies the specific available server. The message type is set to "agent message" and command to "request." in sequence 16a, described below. Upon returning from sequence 16a, execution continues in step 500, wherein the newly-instantiated agent object is inserted as the next element in the agent array dimensioned in step 482. A new agent dispatcher information object is created in step 502, wherein the agent's formal and package name is identified. Then, in step 504, the IP address of the dispatcher and the destination server are set in the dispatcher information object. In step 506, the dispatcher information object is passed into the agent object created in step 498. A test is then performed in step 508 to see if there are more tasks that need to be completed. If there are additional tasks, execution continues at step 486; otherwise, a flag is set in step 510, indicating that the sequencing of agents has been completed.

Figure 19:
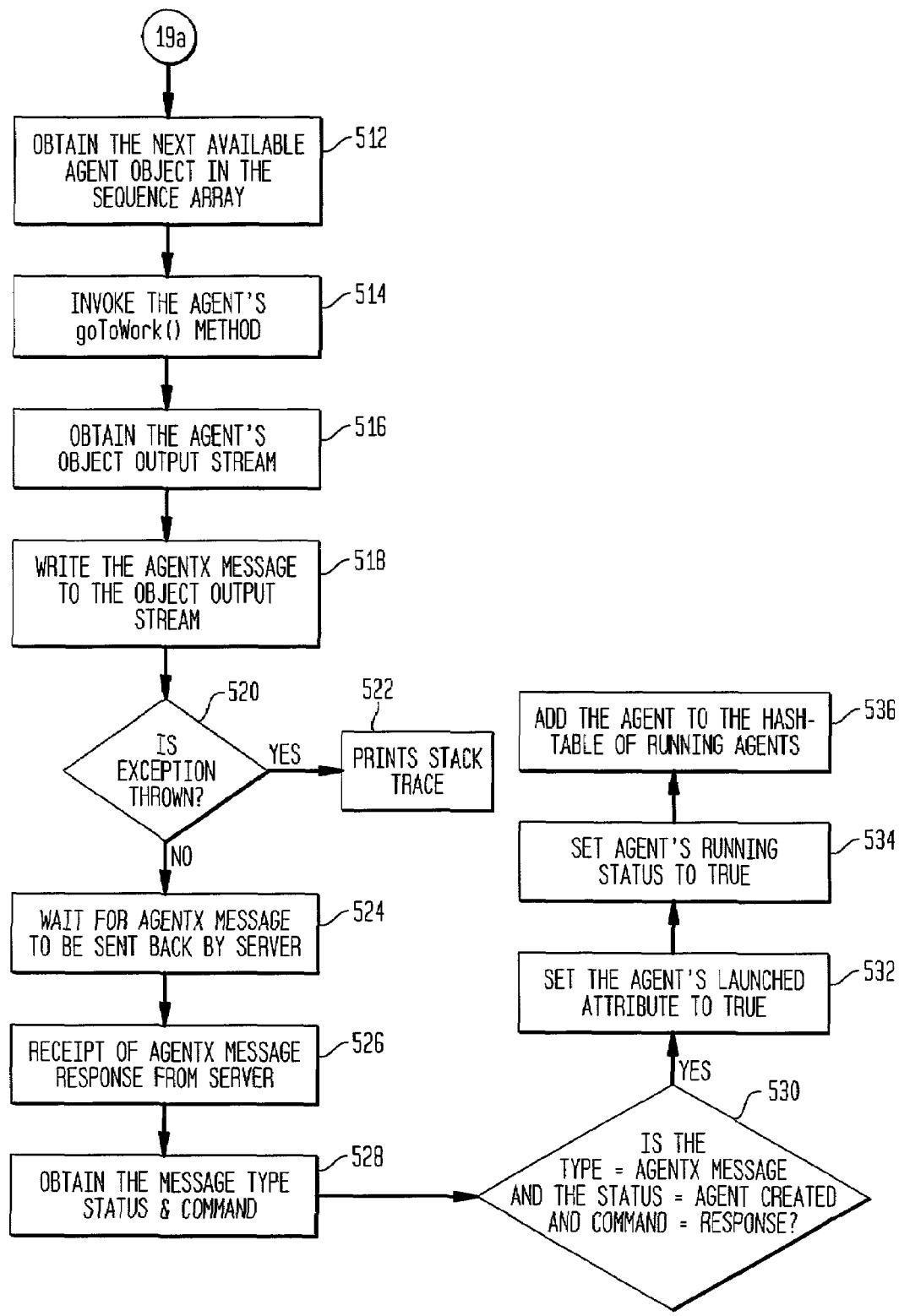
FIG. 19 is a flowchart showing processes for launching an agent and obtaining a result.

FIG. 19 is a flowchart showing processes within an agent dispatcher when launching a mobile agent. Beginning in step 512, the next element in the previously sequenced array of agent objects created in step 482 is obtained. The goToWork( ) method is then invoked in step 514. After this function completes, the agents obtains a reference to its object output stream in step 516. Program flow continues to step 518 where the agent message is written to the output stream. If an exception is thrown in step 520, then a stack trace is sent to the standard output in step 522. Alternatively, if the object is written successfully, program execution pauses in step 524 to wait for an agent message to be sent back by the remote server. When a response is received in step 526, execution continues. The message type and status of the command is obtained in step 528. A decision point is then reached in step 530. If the message type is equal to "agent message," the status set to "agent created," and the command value is equal to "response," then execution continues in step 532. In step 532 the agent's boolean launch value is set to true. The agent's running status is also set to true in step 534. Finally, in step 536, the remote agent is added to the hash table containing all running agents.

Figure 20:
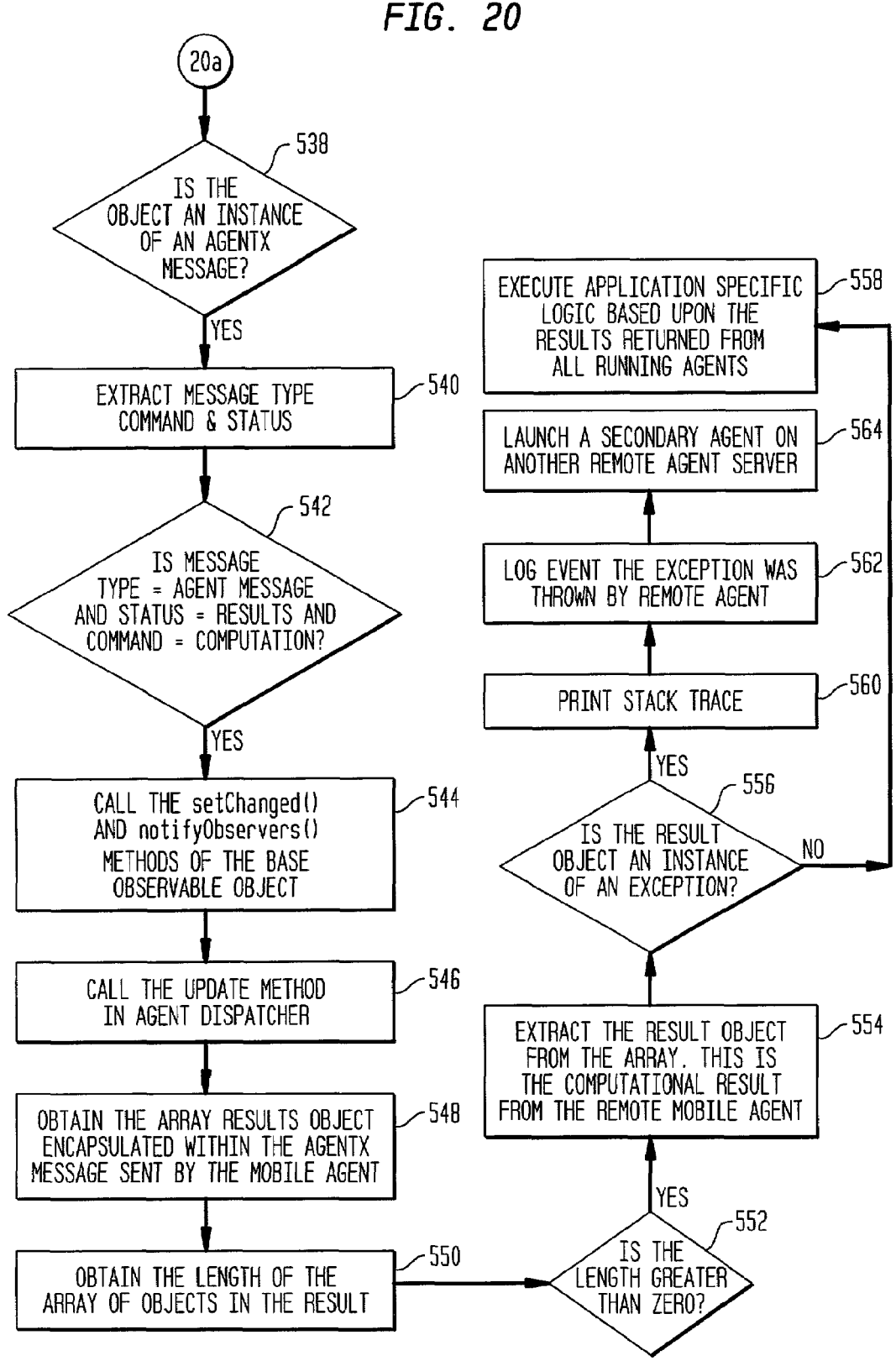
FIG. 20 is a flowchart showing processes for receiving results from a mobile agent that has just complete processing on a remote machine.

FIG. 20 is a flowchart showing processes for receiving at an agent dispatcher results sent back by a mobile agent. In step 538, a decision is reached after an agent server running alongside the dispatcher accepts a socket connection and subsequently reads a serialized object, as previously described in step 160. If the object is an instance of an agent message, control is given to step 540 wherein the message type, command, and status values are extracted. In step 542 a test is performed to see if the message type is equal to "Agent Message," status is set to results, and the command value is "Computation." If the test is positive then the setChanged( ) and notifyObservers( ) methods within the agent server module are executed in 544. The agent server is derived from the Observable class. A class that implements the Observer interface automatically has its update method called by step 546. In an embodiment of the present invention, the Observer is the agent dispatcher itself.

In step 548 the array result object is returned by calling getResults( ) with the agent message. In the next step, 550, the length of the array of objects comprising the result is obtained. Next, a decision point is reached in step 552. If the length of the array is greater than zero, execution continues at step 554, wherein the result is extracted from the array object. Then, in step 556, a decision point is reached wherein the result is checked to see if it is an instance of an exception or one of its subclasses. If the result meets these criteria, then a complete stack trace is sent to standard output in step 560. An event is then logged in step 562, indicating that the remote agent failed to complete its task and an exception was returned. In step 564, another mobile agent is then launched on another available server to perform the same task as the previous task which failed to complete, on another available server. If the result is not an exception, then it represents the computational outcome of the process of a remote mobile agent. Finally in step 558, application-specific program logic is executed based upon and utilizing the results returned from all running agents.

Figure 21:
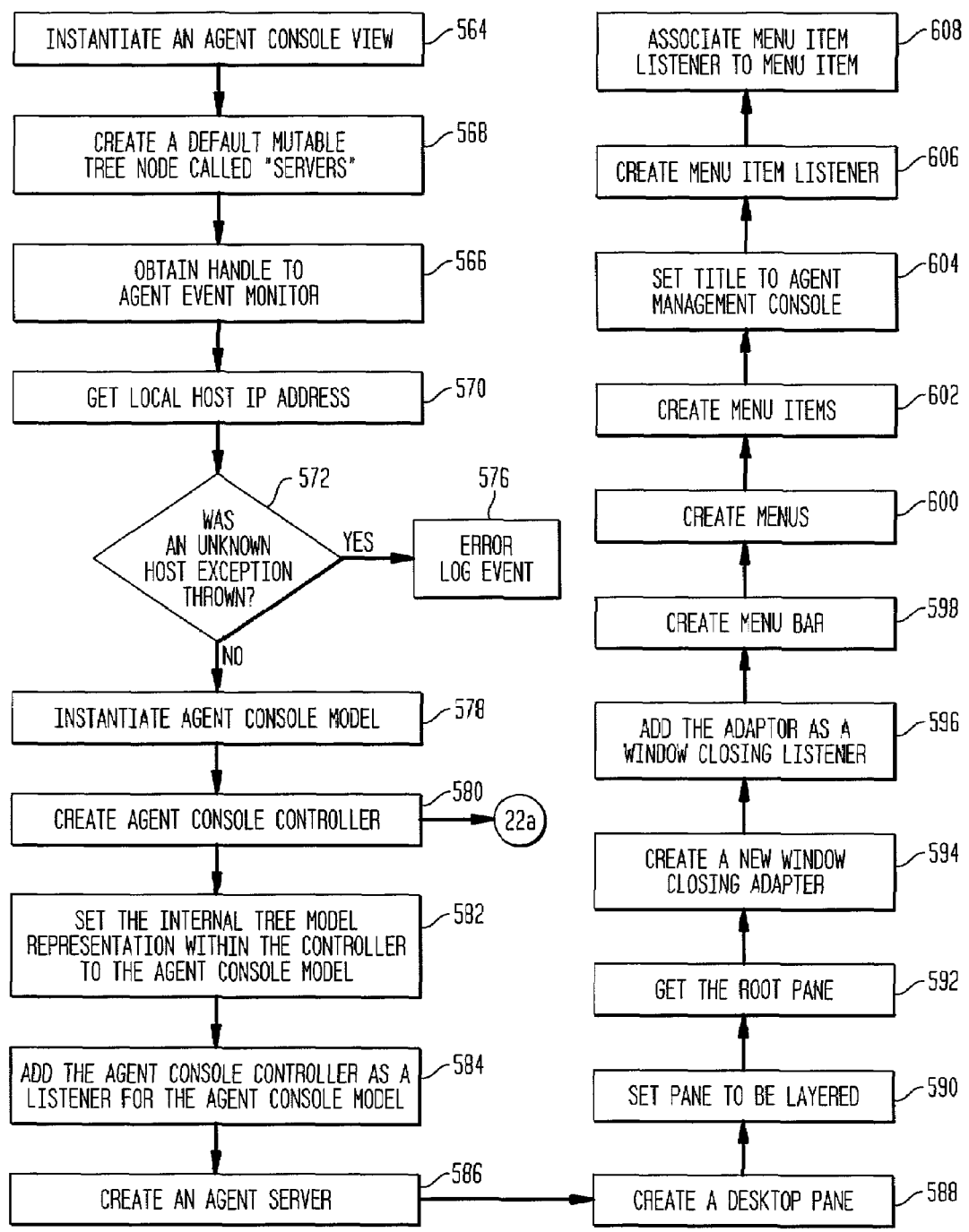
FIG. 21 is a flowchart showing processes for running the agent monitoring console.

FIG. 21 is a flowchart showing the process for initializing and launching an agent monitoring console. In step 564 an agent console view object is instantiated. This object will contain the graphical user interface for the system management components. In step 568, a DefaultMutableTreeNode called "servers" is created. This object will serve as the root data structure containing leaves representing running agents. Next, a handle to the agent event monitor is obtained in step 566. In the following step, 570, the local host's IP address is obtained. A decision point is reached in step 572, wherein a check is made to see if an unknown exception was thrown. If an exception was thrown, processing continues in step 576, at which point an error is written to the system event log. If no exception occurred, processing continues at step 578, wherein an agent console model is instantiated. This object will serve as the data representation for most of the graphical elements displayed within the management console. In step 580 an agent console controller is created. This object serves as the link between the management console and the agents that are executing within the system. The console controller is the portion of the subsystem that receives messages from agents throughout the system as they are created, moved between servers, executed, and complete their assigned tasks.

After all of the above tasks have taken place, in step 582, the internal tree model data member within the console controller is set to the console model created in step 578. Then, the console controller is added as a listener to events propagated by the console model in step 584. Execution continues in step 586, where an agent server is created and started. In step 588, a desktop pane is created. In step 590 the pane is set to be layered. After these tasks are completed a reference to the root pane is then obtained in step 592. Execution then proceeds to step 594, where a new window closing adapter is created. In the next step, 596, the adapter created in the previous step is added as a window closing listener. A menu bar is created in step 598, to which is attached a menu created in step 600, and a number of menu items are created in step 602. Program flow continues with step 604, where the title bar for the main window of the graphical interface is set to "Agent Management Console." Following this event, a new menu item listener is created in step 606. Finally, in step 608 the menu item listener created in the previous step is associated to each menu item.

Figure 22:
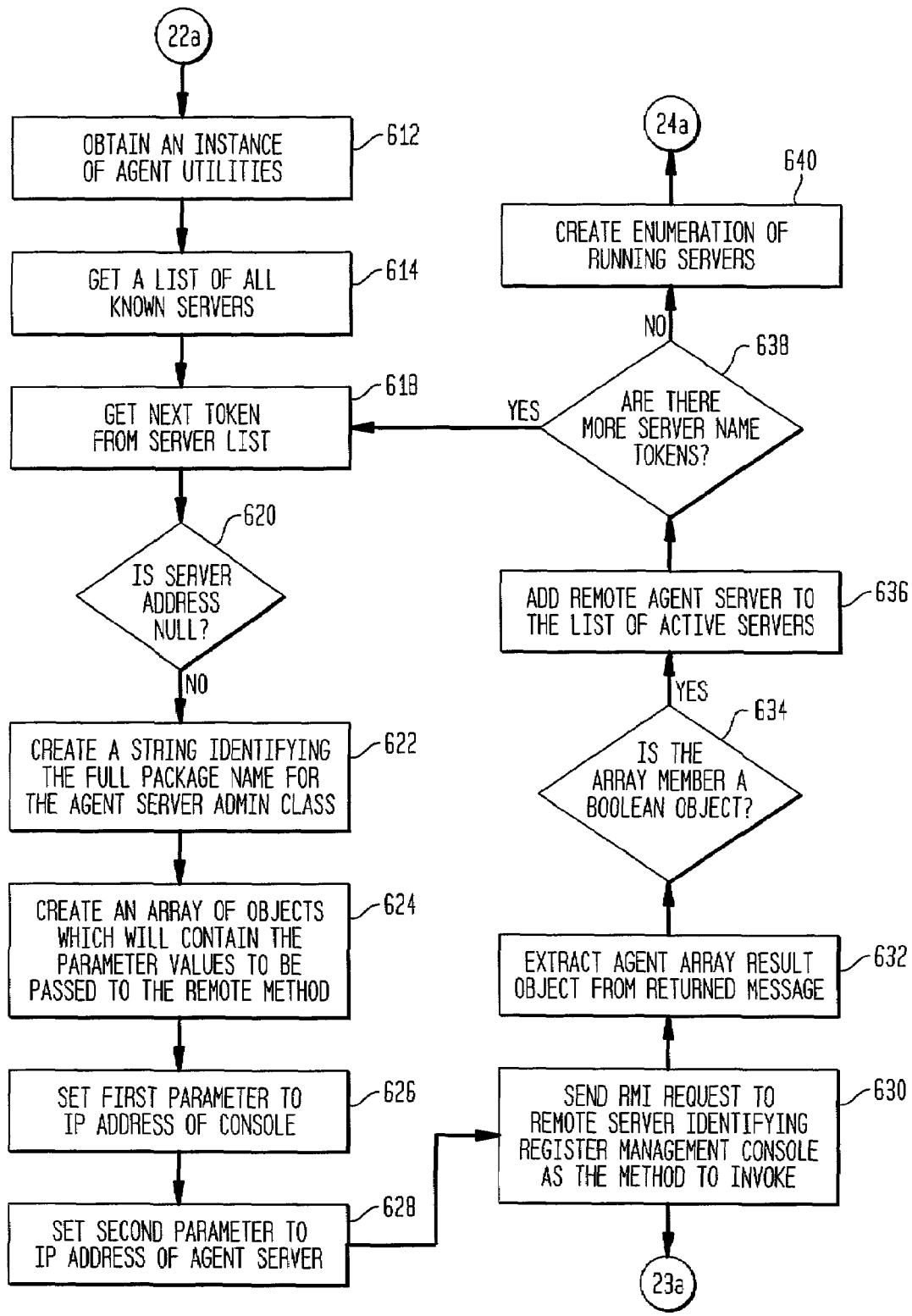
FIG. 22 is a flowchart showing processes for registering the agent console model with remote servers.

FIG. 22 is a flowchart showing processes for registering the management console with remote servers. The flow of events begins with the creation of an agent console controller in step 580, as described above. During the creation of this object a number of steps are taken. The first step, 612, obtains an instance of agent utilities. The second step, 614, is to retrieve a list of all known servers. In step 618, the next token is obtained from the list. A test is then performed in step 620 to determine whether the server's domain name or IP address are null. If this test fails, execution will continue with step 622 where a string identifying the complete package name of the agent server admin class is created. In step 624, an array of objects is created for containing the parameters to be passed to the remote method. In step 626, the first parameter is set to the IP address or domain name of the machine running the management console. Following this the second parameter is set in step 628 to the IP address or machine name of the remote agent server. After parameters are set, an RMI request is sent to the remote server in step 630. The method identified in the RMI request is RegisterManagementConsole. This call is a synchronous (blocking) call which will not return control back to the caller until the registration is completed on the remote server. When program control is returned, the array result object is extracted in step 632 from the message being returned. A decision point is then reached in step 634, whereby the array result object is checked to see if it contains a Boolean object. If so, then control proceeds to step 636 in which the remote server is added to the list of active servers identified by the management console. Another decision point is then reached in step 638 a determination is made as to whether there are more server name tokens in the enumeration of known servers. If so, then execution loops back to step 618. If the last server name token has already been processed, execution continues at step 640. In step 640, an enumeration of all running servers is created.

Figure 23:
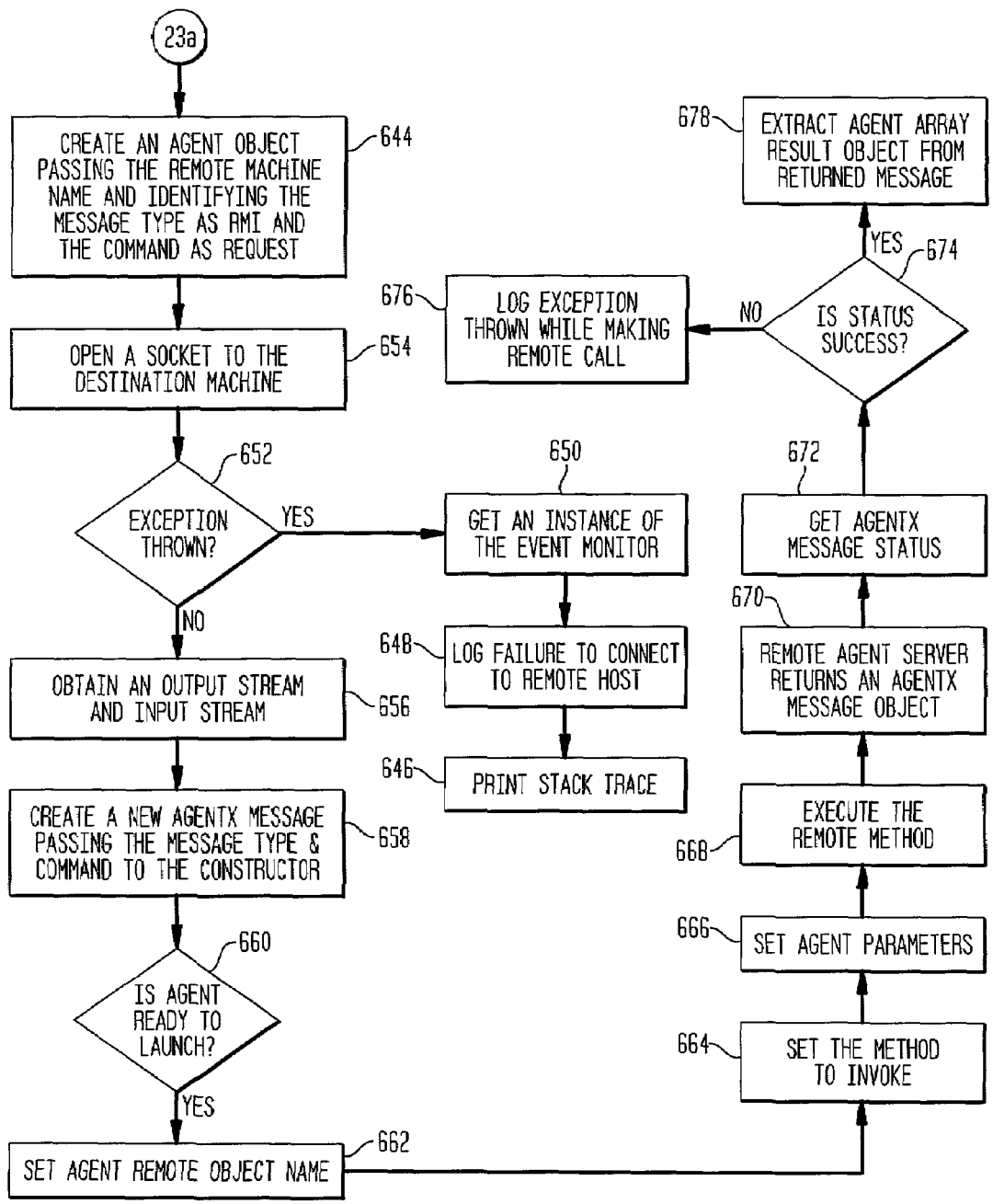
FIG. 23 is a flowchart showing processes for sending an RMI request to a remote server.

FIG. 23 is a flowchart showing processes for sending an RMI request from the agent management console to a remote server. In step 644, a mobile agent object is created, the remote machine name or IP address is passed, the message type is identified as RMI, and the command is set to "request." Then, in step 654, a client socket is instantiated and opened for both read and write operations. If an exception is thrown in step 652, execution proceeds to step 650 wherein an instance of the event monitor is obtained. Subsequently, the failure to connect to the remote host is logged in step 648. A stack trace is then sent to the standard output in step 646. If an exception is not thrown when creating the socket, then execution proceeds on to steps 656, where an output and input stream are obtained from the open socket. Next, in step 658, a new agent message is created and the message type and command identified in step 644 is passed to the constructor.

Another test point is then reached in step 660. If the newly created agent is ready to launch, the process continues with step 662, wherein the agent's remote object name is set. In step 664 the method to invoke remotely is set. Parameters for the remote method invocation are set in step 666 and the remote method is executed in step 668. In a preferred embodiment, the RMI call is a synchronous blocking call. When the RMI returns in step 670, an agent message is received from the remote server. Once the message is available, the message status is retrieved in step 672. A decision point is then reached in step 674. If the status is equal to success then execution continues to step 678, wherein the Array result object is extracted from the returned message of step 670. If the status of the operation is not equal to success, the exception contained in the message object is extracted and the exception logged in step 676.

Figure 24:
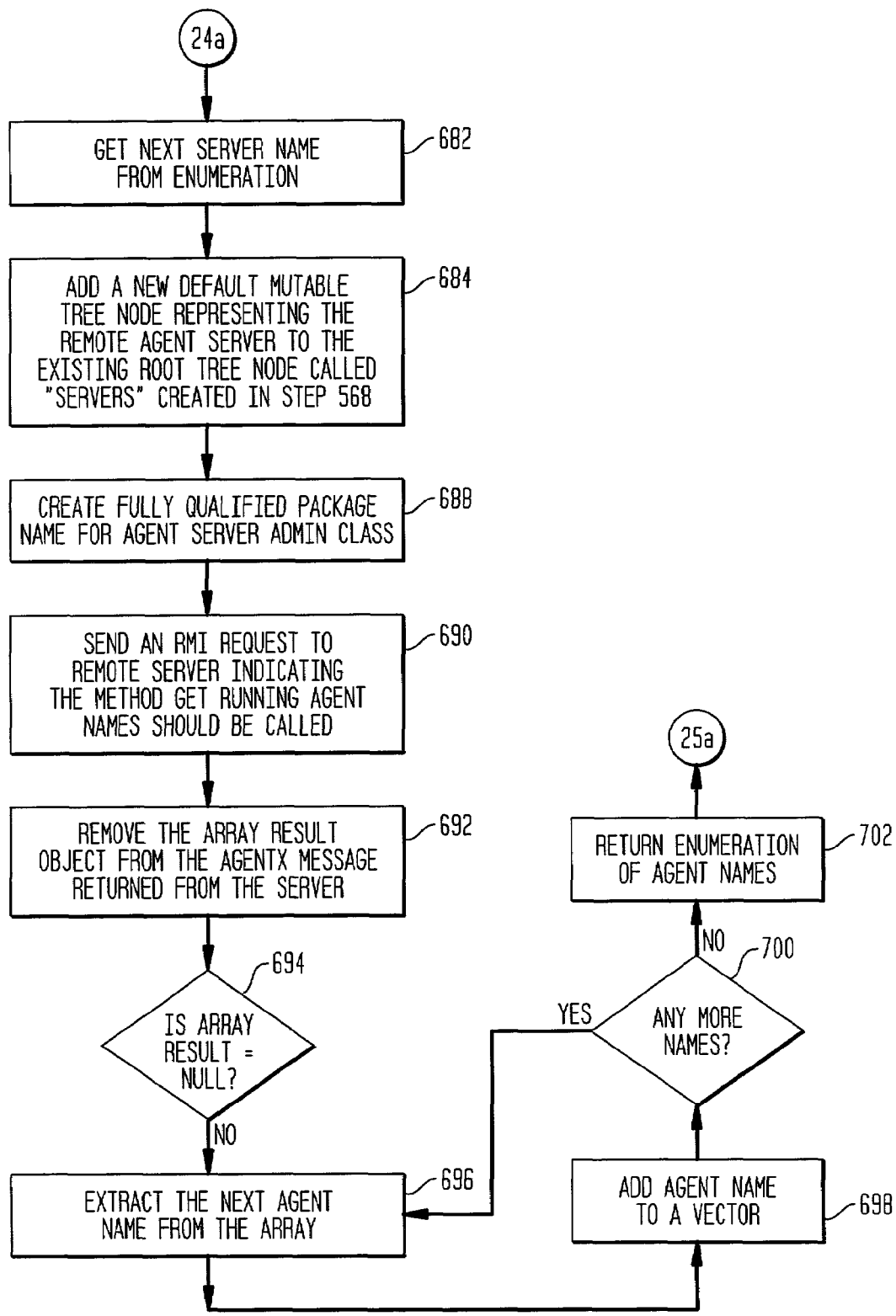
FIGS. 24, 25 are a flowchart showing processes for obtaining a list of running servers and building a tree node data representation model.

FIG. 24 is a flowchart processes for obtaining a list of running servers and building a tree node data model. This process is started by obtaining the next server name from the enumeration of currently running servers in step 682. In step 684, a new default mutable tree node representing the remote server is added to the existing root node which was created in step 568. Next, in step 688, a fully qualified package name is created for the agent server admin class. In step 690, an RMI request to a remote server identifying the method getRunningAgentNames is called. The Array result object is then removed from the agent message sent back by the remote server in step 692. A decision point is then reached in step 694, whereby the result object is checked to determine if it equals a null value. If the result object's value is not equal to null, execution continues in step 696, wherein the first agent's name is extracted from the result object. In step 698, the name is added to a vector built iteratively. Another test point is encountered in step 700, wherein the result object is examined to determine if it contains any additional agent names. If additional agent names exist, step 700 re-invokes step 696. If no additional agent names exist, step 700 re-invokes step 702, wherein an enumeration of agent names is returned.

Figure 25:
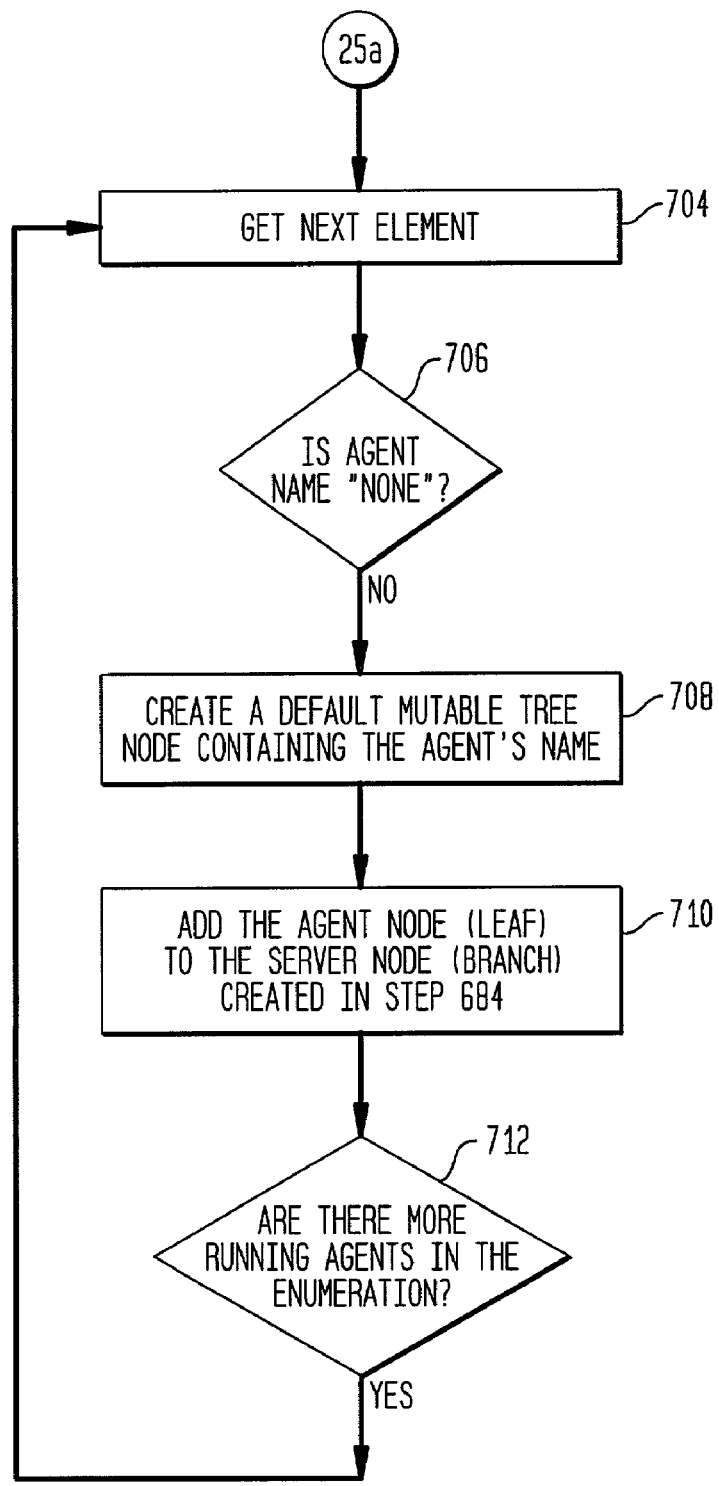

FIG. 25 is a flowchart showing continued processes for building a tree model of running servers and agents. In step 704, the next element of the enumeration containing agent names is acquired. A decision point is reached in step 706, wherein the agent name is compared to the string "none." If the result is true, then execution proceeds to step 708. In step 708, a new DefaultMutableTreeNode containing the name of the running agent is created. After this action is complete, the agent node (leaf) is added in step 710 to the server node (branch) created in step 684. The last step in the process, step 712, checks to see if there are any remaining agent names in the enumeration. If so, step 712 re-invokes step 704. If no agent names exist in the enumeration, then the tree node data representation has been fully populated.

Figure 26:
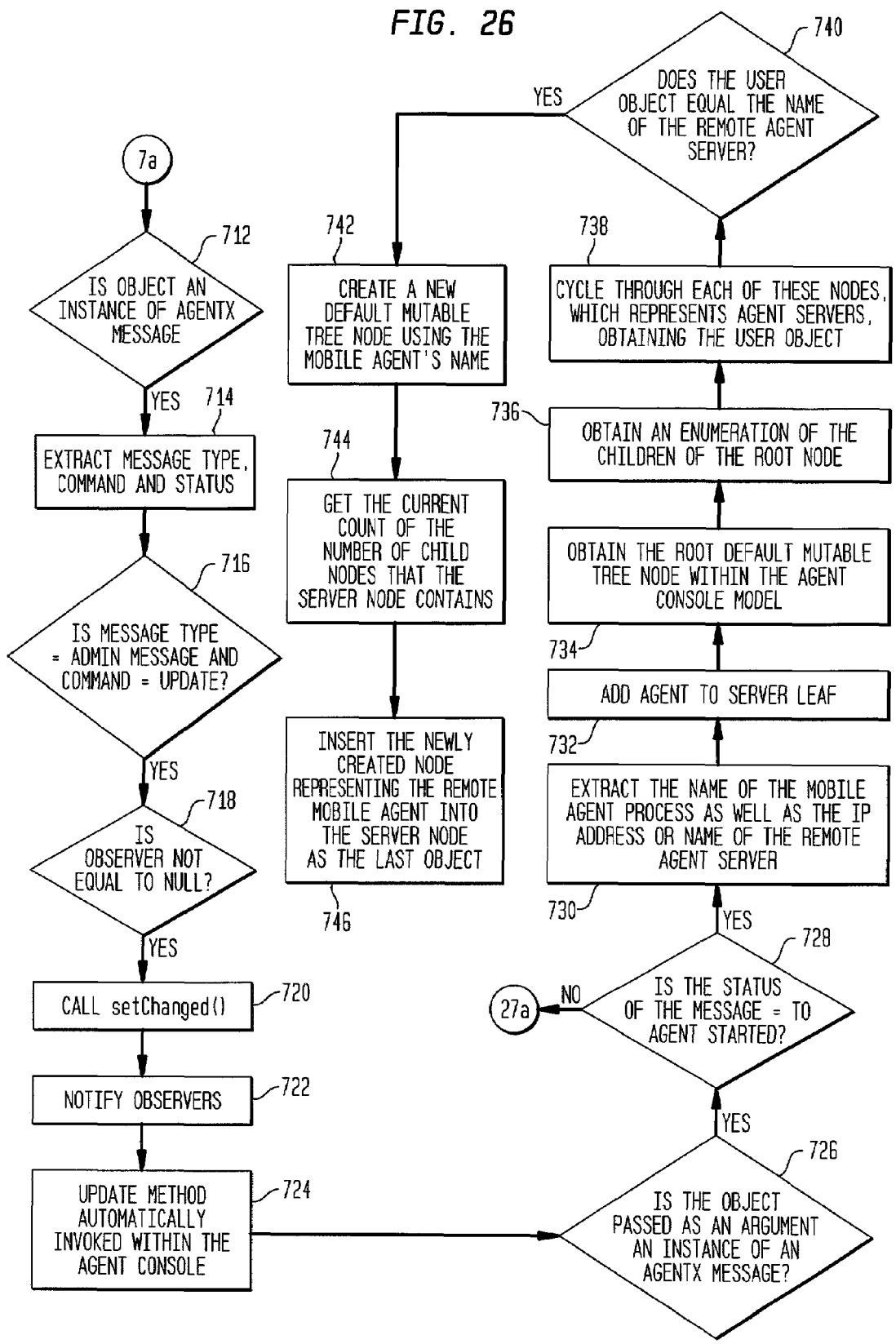
FIG. 26 is a flowchart showing management console processes for receiving messages indicating that an agent process has started on a remote server.

FIG. 26 is a flowchart showing processes for receiving at the management console messages indicating an agent process has started on a remote server. Starting at 7a, at which point in time step 160 has completed successfully, a decision point is reached in step 712. In step 712, an object is read to determine if it is an instance of an agent message. If the object is an instance of an agent message, then processing continues with step 714, at which point the message type, command, and status values are extracted. In step 716, another test point is encountered, whereby the message type is compared to "admin message" and the command compared to "update." If both of these conditions are met, step 716 invokes step 718, whereby the observer object is tested to see if it is equal to null. The observer object represents the agent console controller created in step 580. If the value of the observer is not null, execution proceeds to step 720, where the setChanged( ) method of the observable object is called. In step 722, the notifyObservers( ) method is called in the same agent server. This method automatically invokes the update( ) method within the agent console controller object in step 724. A test point is reached in step 726, whereby the object passed as a parameter to the update( ) method is checked to see if its type is an agent message. Under normal processing conditions, the object type is an agent message.

Another decision point is then reached in step 728, wherein the status value from the message is tested to see if it equals "agent started." If so, step 730 is invoked, at which point the given name of the mobile agent process running on the remote machine, in addition to the host name, is extracted from the agent message. In addition, the IP address of the remote machine is also obtained from the message. In the step 734, the root DefaultMutableTreeNode, which is stored as member data within the agent console model, is retrieved. Thereafter, in step 736, an enumeration of the children of the root node is obtained. Step 738 cycles through all child nodes, each of which represents an agent server, and obtains their respective user object.

At step 740 a decision point is then reached. The user object, embodied as a String representing the name of the remote server, is compared to the server name obtained in step 730. If they are equal, execution continues to step 742, wherein a DefaultMutableTreeNode is created using the name of the agent running on the remote server. Thereafter, in step 744, the current count for the number of child nodes that the agent server node contains is acquired. Finally the process is completed in step 746, wherein the node representing the remote agent is added to the server node as the very last object.

Figure 27:
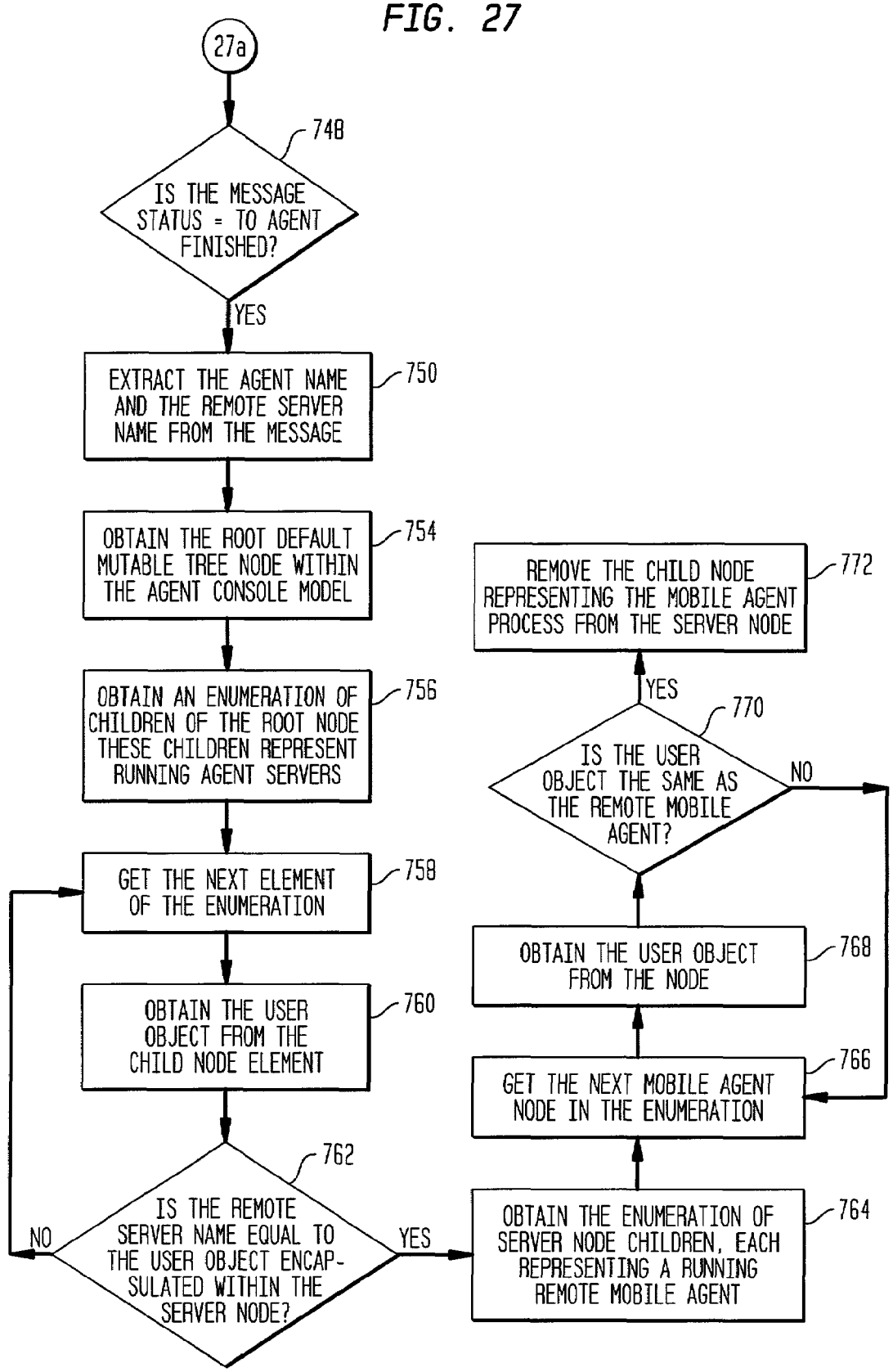
FIG. 27 is a flowchart showing management console processes for receiving messages indicating that an agent process has completed on a remote server.

FIG. 27 is a flowchart showing processes for receiving a message at the management console indicating that a remote agent process has successfully completed. Beginning with step 748, a decision is invoked wherein the status of the message is checked to see if it equals "agent finished." If true, execution continues at step 750 where the agent and remote server names are extracted from the incoming message. Then, in step 754, the root DefaultMutableTreeNode is obtained from within the agent console model. Processing continues to step 756, where an enumeration of children of the root node is obtained. The children represent the remote agent servers that are currently running. The next available element of the enumeration is then obtained in step 758. The user object is extracted form the child node element in step 760.

In step 762 a decision point is reached, wherein a test is made to determine if the remote server name is equal to the user object within the server node. If the result of this test is positive, then control proceeds to step 764, where an enumeration of server node children are obtained. Each child in this enumeration represents a running mobile agent. The next step, 766, retrieves the next mobile agent node in the enumeration. Thereafter, the user object is obtained from that node in step 768. A decision point is then invoked in step 770 whereby the user object is compared to the name of the remote agent that has just finished running. If a positive comparison is made, control passes on to step 772. In this final step the child node representing the agent is removed from the server node.

Figure 28:
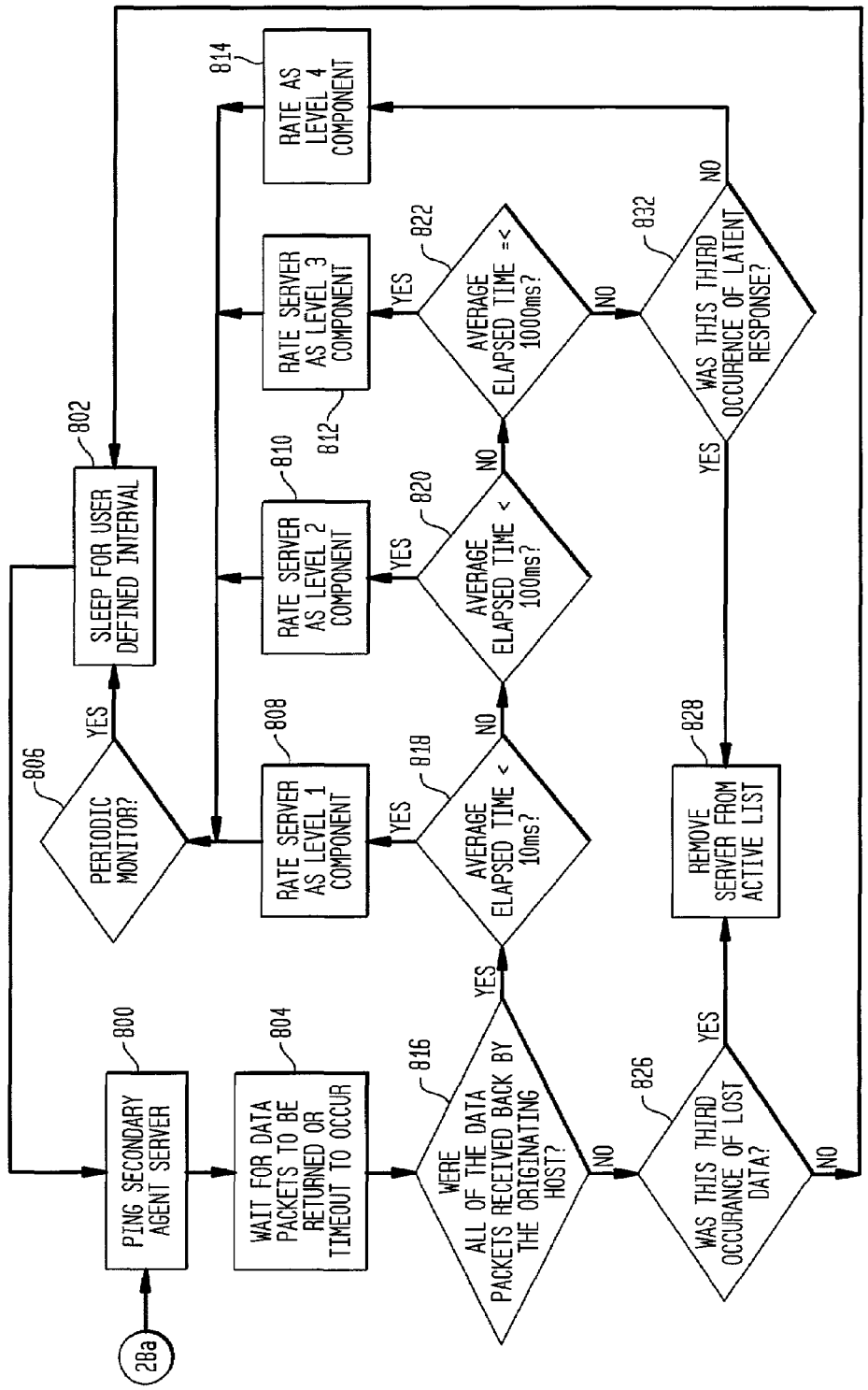
FIG. 28 is a flowchart showing processes for determining network latency.

FIG. 28 is a flowchart showing processes for determining network latency. Beginning in step 800, a sequence of four data packets, each thirty-two bytes in length, is sent to a remote agent server The remote server reads the data and sends it back to the originating host. During this latency period, the originating host waits for the packets to be returned or a timeout to occur in step 804. A decision is reached, in step 816, at which point a check is made on the originating host to see if one hundred percent (100%) of the data is returned. If all the data is not returned, execution continues with step 826. If all four packets are returned then execution continues at step 818, wherein a check is made to see if the average elapsed time for the round trips made by the packets is less than ten milliseconds. If so, step 808 is invoked, wherein the remote server is identified as a level one component. If the result of the test in step 818 in false, then execution continues to step 820, wherein the average elapsed time is compared to a period of one hundred milliseconds. If the elapsed time is less than one hundred milliseconds, the server is rated as a level two component in step 810. In step 822, a decision is made as to whether the round trip time is between one hundred and one thousand milliseconds. If so, execution proceeds to step 812, at which point the server is rated as a level three component. If the average elapsed time is greater than one thousand milliseconds, as ascertained in step 822, then step 822 will invoke step 832. In step 832, a test is performed to see if a third instance of latent response has occurred. If a third instance has not occurred, then control proceeds to step 814, wherein the remote server is rated as a level four component.

If a third instance of a latent response has occurred, control is then passed to step 828. Step 828 removes the remote server from the active and available list. If processing reaches the point where a server has been rated, execution continues with step 806 to determine if a periodic monitoring of the server is required. If periodic monitoring is required, this network latency thread will halt for a system-defined period of time in step 802. Upon awakening, the thread will once again ping the remote server as indicated in step 800. If there is a data loss from the test performed in step 816, execution continues with step 826. A check is then performed to determine if a third instance of lost data has occurred. If so, then the server is removed from the active and available list in step 828. Alternatively, control passes to step 802, wherein the thread is put to sleep for a pre-defined period of time.

Figure 29:
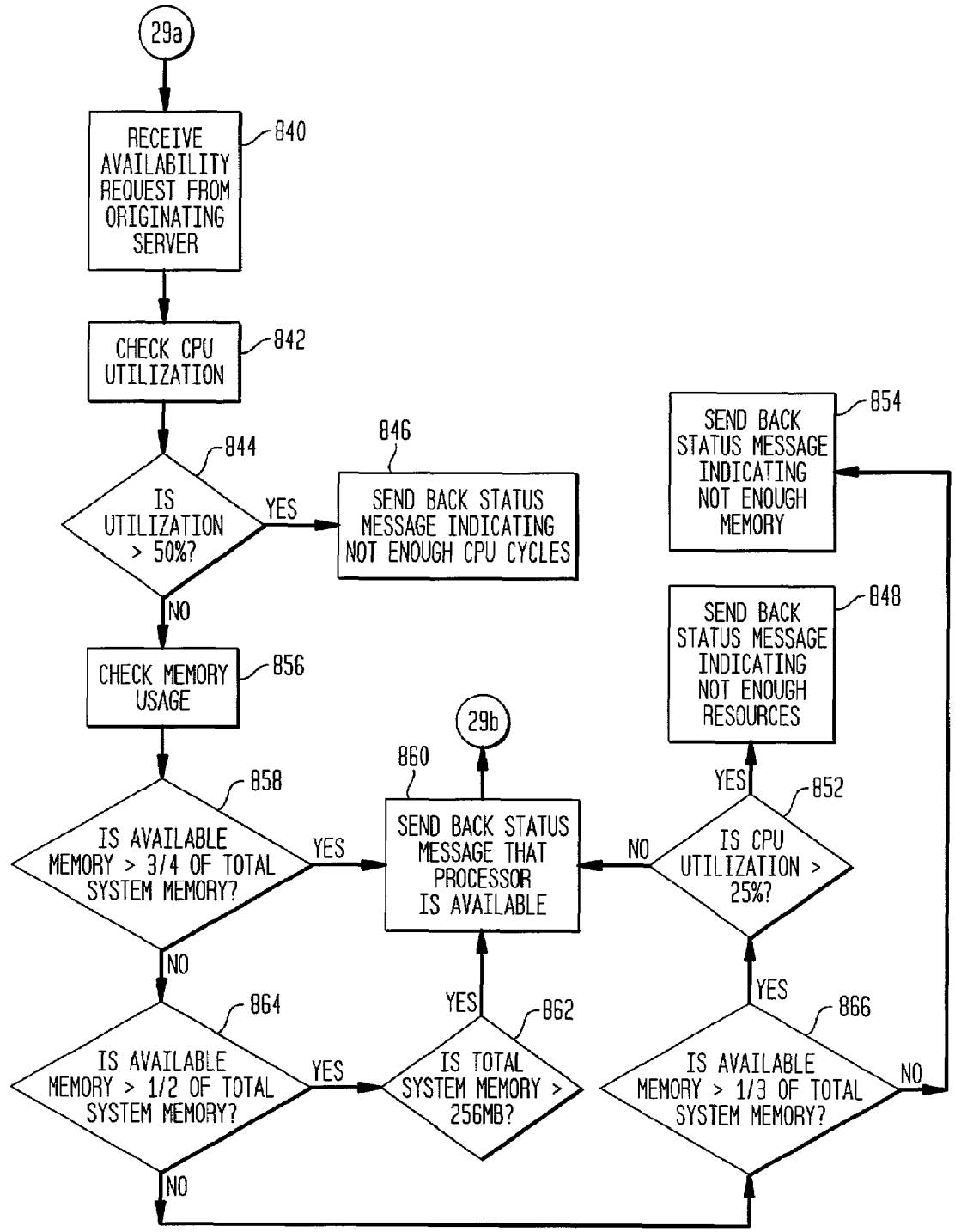
FIG. 29 is a flowchart showing processes for determining server availability that are executed on a remote server.

FIG. 29 is a flowchart showing processes executed on a remote server for determining server availability. Beginning with step 840, an availability request is received from an originating server. Then, in step 842, the CPU utilization for the machine is ascertained. A decision point is then reached in step 844, wherein a test is made to determine whether CPU utilization is greater than fifty percent. If utilization is greater than fifty percent, an agent message is returned to the originating host in step 846, indicating that there are not enough CPU cycles available. If the CPU is underutilized, step 856 is invoked, wherein memory availability is checked. Step 858 determines whether the available memory is greater than three-quarters of total system memory. If so, execution continues to step 860.

In step 860, an agent message is returned to the originating server, indicating that the current processor is capable of running a mobile agent task. If the test performed in step 858 fails, then decision point 864 is invoked. In step 864, the available memory is compared to the total system memory. If the result is greater than fifty but less than seventy-five percent, another test is made in step 862. In step 862, total system memory is checked to determine whether same is greater than 256 megabytes of Random Access Memory (RAM). If the total RAM is greater than 256 megabytes, control is passed to step 860, described above. If available memory is less than fifty percent of total system memory, then execution proceeds to another decision point. In step 866, available memory is compared once again to the total system memory. If the available memory is not greater than one third of the system memory, a status message is sent back to the originating server in step 854, indicating that the remote server does not have enough memory. If the available memory is greater than one third of the total system memory, a test is performed in step 852. CPU utilization is again examined. If the utilization is more than twenty-five percent, a status message is returned to the originating host in step 848, indicating that not enough resources are available on the targeted remote agent server. If CPU utilization is less than twenty-five percent, a message is returned to the originating host in step 860, indicating that the remote server's process is currently available to run a mobile agent process.

Figure 30:
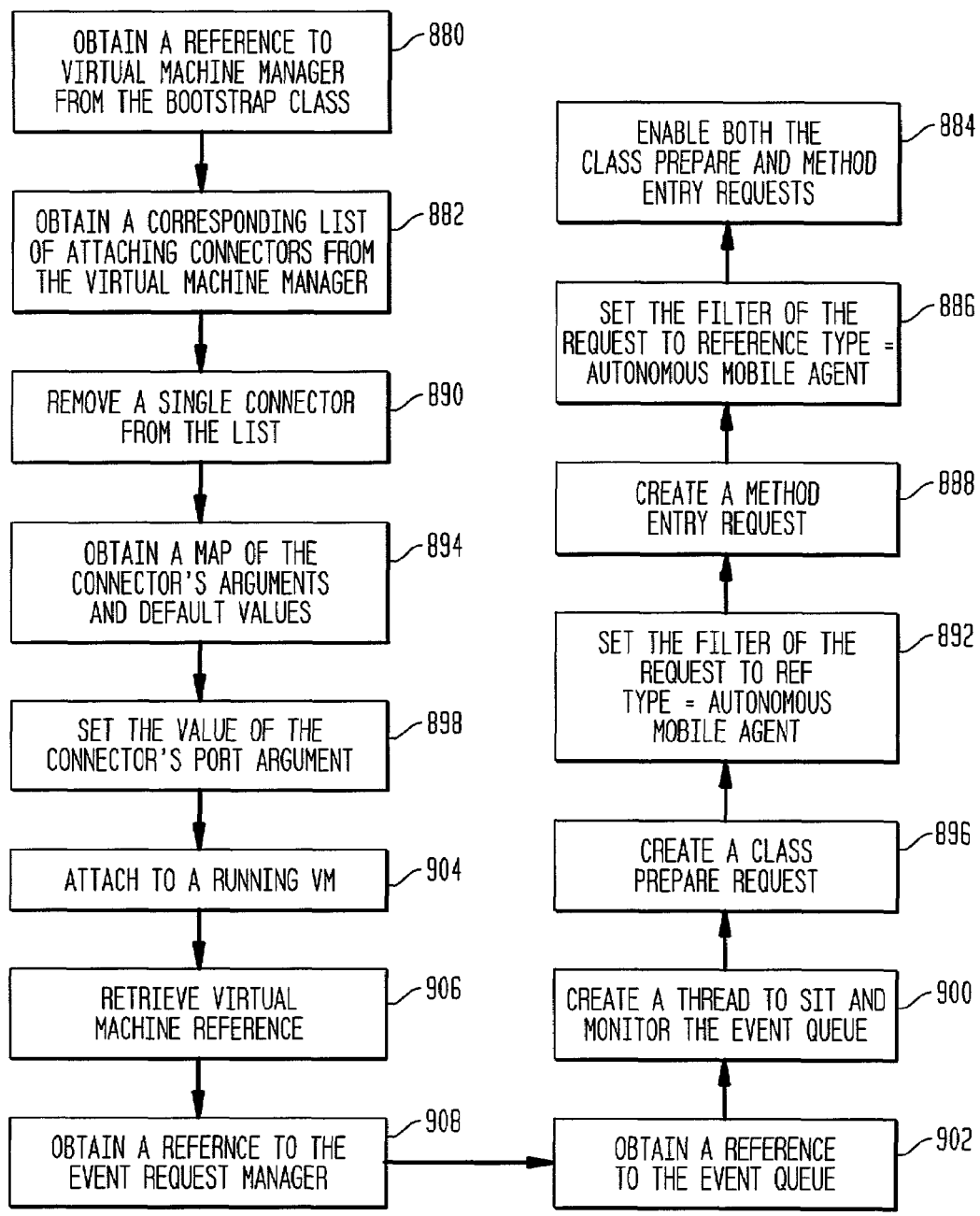
FIG. 30 is a flowchart showing processes for launching an agent debugger.

FIG. 30 is a flowchart showing processes for launching an agent debugger of the present invention. Beginning in step 880, a reference to the virtual machine manager is obtained from the bootstrap class. A corresponding list of attaching connectors is then obtained from the virtual machine manager in step 882. In step 890 a single connector is removed from the list. Program flow then continues when a map of the connector's arguments and default values are obtained in step 894. In step 898, the value for the connector's port argument is obtained. Execution then continues to step 904, wherein in which the agent debugger attaches to a running Java virtual machine. In step 906 the agent debugger retrieves a reference to the virtual machine to which it has attached. Then, in step 908, it retrieves a reference to the event request manager. Upon retrieving the reference, the agent debugger obtains a reference to the event queue in step 902. The agent debugger then creates a new thread in step 900, which will sit and monitor the event queue for incoming events. A class prepare request is then created in step 896. Next, the filter for the request is set such that the reference type equals autonomous mobile agent in step 892. The process continues with step 888, wherein a method entry request is created. Then, in step 886, the filter of the request is set such that the reference type is equal to autonomous mobile agent. Finally, the process completes in step 884, wherein both the class prepare and method entry requests are enabled.

Figure 31:
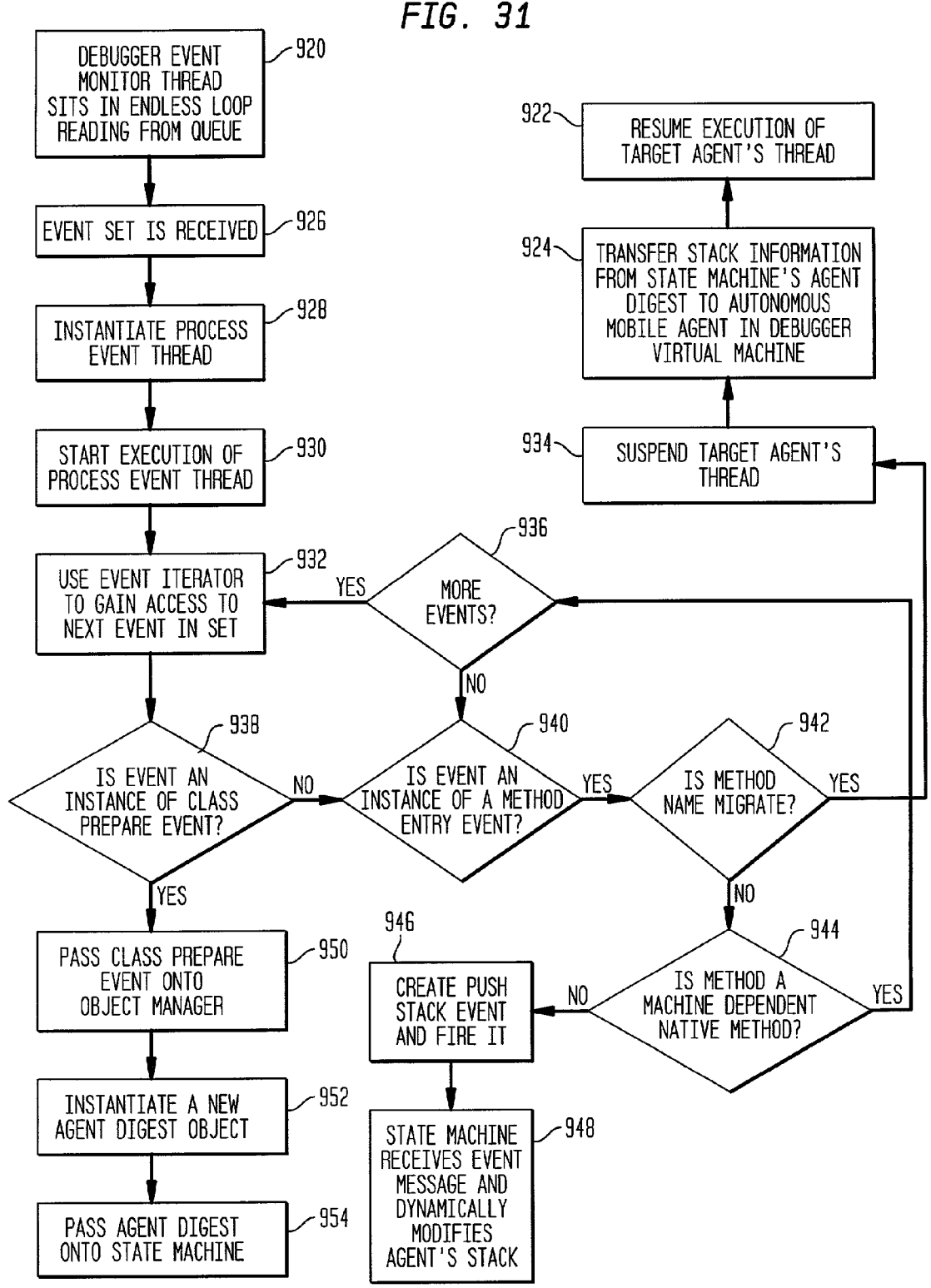
FIG. 31 is a flowchart showing processes for handling receipt of agent debugger events.

FIG. 31 is a flowchart showing agent debugger processes for receiving and acting in response to events. Beginning with step 920, the agent debugger's event monitor thread is configured to remain in an idle state while periodically reading from the queue. In step 926 an event set is received. Directly after this event is read a new thread to process the event is created in step 928. Following the instantiation of the thread, the thread is then started in step 930. In step 932, an event iterator object is used to gain access to the next available element in the event set. After extracting the next event, a decision point is reached in step 938. It is at this junction that the event is tested to see if it is an instance of a class prepare event. If the event is an instance of a class prepare event, it is passed to the agent debugger object manager in step 950. Once this task completes, processing continues with the instantiation of a new agent digest object in step 952. Then, the newly created agent digest is forwarded to the agent debugger's state machine component in step 954. If the test performed in step 938 yields a false value, then program control passes onto step 940. In step 940 the event is checked to see if it is an instance of a method entry event. If it is such an event type, then processing continues with step 942, where the name of the method is compared to "migrate." If a negative comparison results, step 944 is invoked. Additionally, the method is examined to determine if it is a machine-dependent native method. If the method is not a machine-dependent method, a push stack event is created and fired in step 946.

In step 948, the agent debugger state machine component receives the push stack event and dynamically modifies the agent's logical stack in temporary storage. If step 944 determines that the method is a native method, execution is passed to step 936, at which point the system queries the event iterator to determine whether there are any more events available for processing. If there are still events waiting, step 932 is re-invoked. If step 942 determines that the method name is "migrate" execution will continue with step 934. In step 934 the agent debugger will suspend the targeted mobile agent's primary thread of execution on the remote host. In the next step, 924, the stack information contained within the debuggers state machine's agent digest is transferred to the newly-migrated autonomous mobile agent paused in the debuggee's virtual machine. In the final step, 922, the agent debugger restarts the execution of the target mobile agent's thread.

Figure 32:
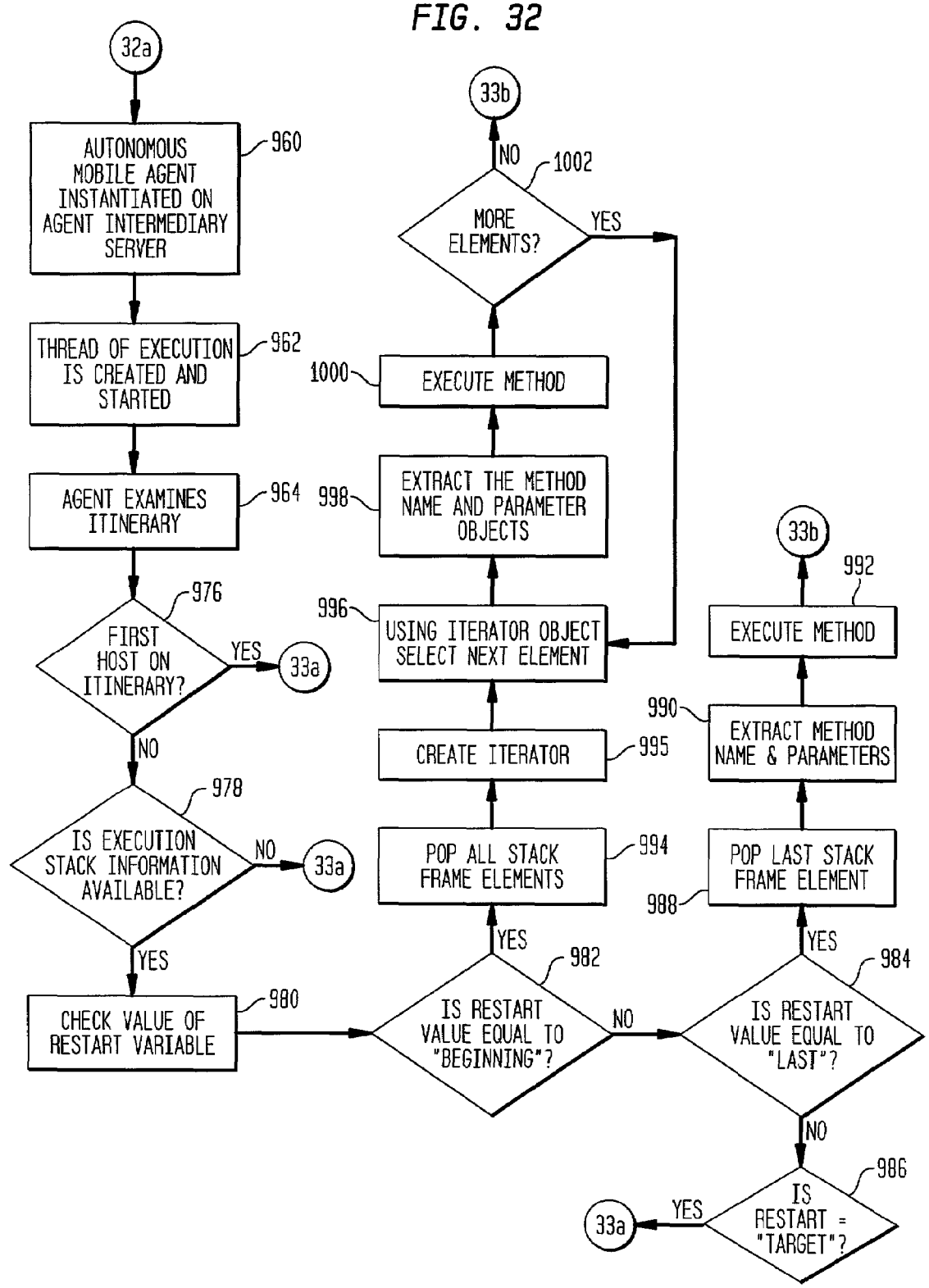
FIG. 32 is a flowchart showing processes for migrating and running autonomous mobile agents using an execution stack.

FIG. 32 is a flowchart showing the migration and initialization of an autonomous mobile agent where the execution stack is available. In step 960, an autonomous mobile agent is instantiated on an agent intermediary server. Then, in step 962, the autonomous mobile agent's thread of execution is created and started. The agent then carefully examines its itinerary in step 964. A decision point is then reached in step 976 and a check is made to see if this server is the first one on its itinerary. If so, then execution continues to point 33*a*, described in detail below and depicted in FIG. 33. If the server is not the first host visited, program flow continues to step 978, at which point another decision is reached.

In step 978, a check is made to determine whether execution stack information is available. If such information is not available, then execution continues at entry point 33*a*, described in detail below and depicted in FIG. 33. If such information is available, step 980 is invoked, whereby the value of the restart variable is checked. In step 982 the value of the restart variable is evaluated and compared to "beginning." If the result is true, step 994 is invoked, wherein all of the stack frame elements are removed. Then, in step 995, an iterator object is created and all of the available stack frame elements are placed into it. Thereafter, in step 996, the iterator is used to return the next available stack frame element. The method name and parameter objects are then extracted from the stack frame in step 998.

Having both the method name and parameter objects available, the autonomous mobile agent uses the Java reflection API's to execute the method in step 1000. In step 1002, a decision point is then reached wherein a check is made to determine whether additional stack frame elements exist. If additional elements exist, then execution resumes at step 996; conversely, execution continues at entry point 33*b*, described below and illustrated in FIG. 33. If the restart value determined in step 982 is not equal to "beginning," execution moves on to step 984, wherein the state of the restart variable is also evaluated. If its value is equal to "last," execution continues at step 988, at which point the last stack frame element is obtained. In step 990, the method name and parameters are obtained from the stack frame object. The method is then executed in step 992, and control continues at entry point 33*b*, described below. If the restart value tested in step 984 is not equal to "last," execution continues at step 986, where a test is made to see if the restart value equals "target." If so, execution continues with entry point 33*a*, described below.

Figure 33:
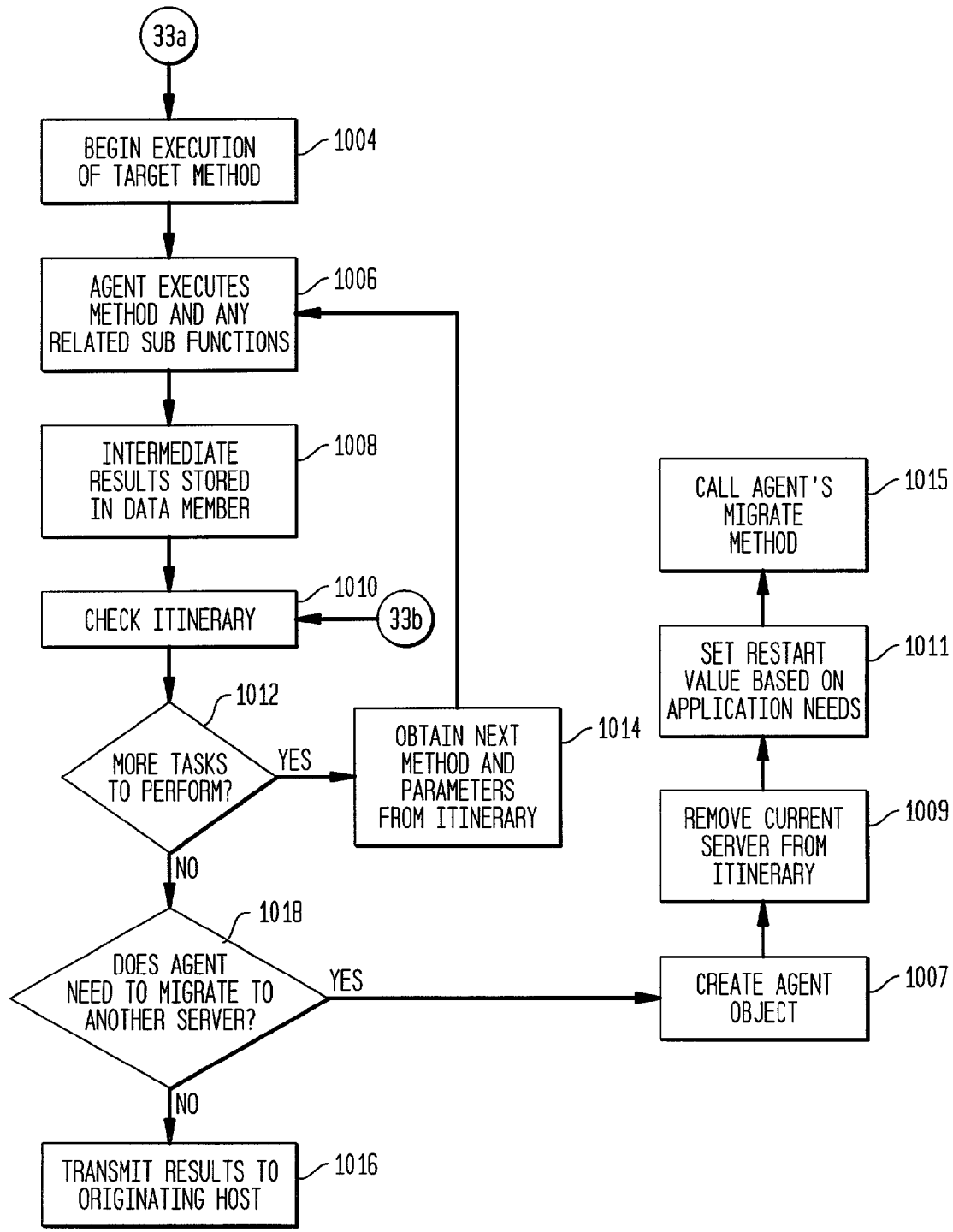
FIG. 33 is a flowchart showing processes for migrating and running autonomous mobile agents when either a first server on itinerary or execution stack is unavailable.

FIG. 33 is a flowchart showing the migration and running of an autonomous agent either on the first server of its itinerary or if its execution stack is unavailable. In step 1004, execution of the target method as defined in the agent's itinerary is initiated. In the following step, 1006, the agent executes any sub functions or tasks upon which the target method relies. The intermediary results are then stored as member data within the autonomous agent in step 1008. In step 1010, the agent checks its itinerary. A decision point is then reached in step 1012, wherein the agent evaluates the itinerary to determine whether there are additional tasks to perform. If additional tasks exist, execution continues at step 1014 wherein the agent obtains the method name and formal parameters of the next function to invoke. Control then loops back to step 1006. If step 1012 determines that there are no more tasks to perform, processing continues at step 1018. If the agent's itinerary indicates that the remote host was the last one to visit, then execution continues with step 1016 and the results of localized processing are transmitted to the originating host. If the agent's itinerary indicates that it should migrate to another server, then the step 1007 is invoked, at which point an agent object is created. In step 1009, the current host is removed from the list of target hosts to visit within the itinerary. Then, in step 1011, the restart value is set based upon application specific processing needs. Finally, in step 1015, a call is made to the agent's migrate method to transport it to another remote server.

Figure 34:
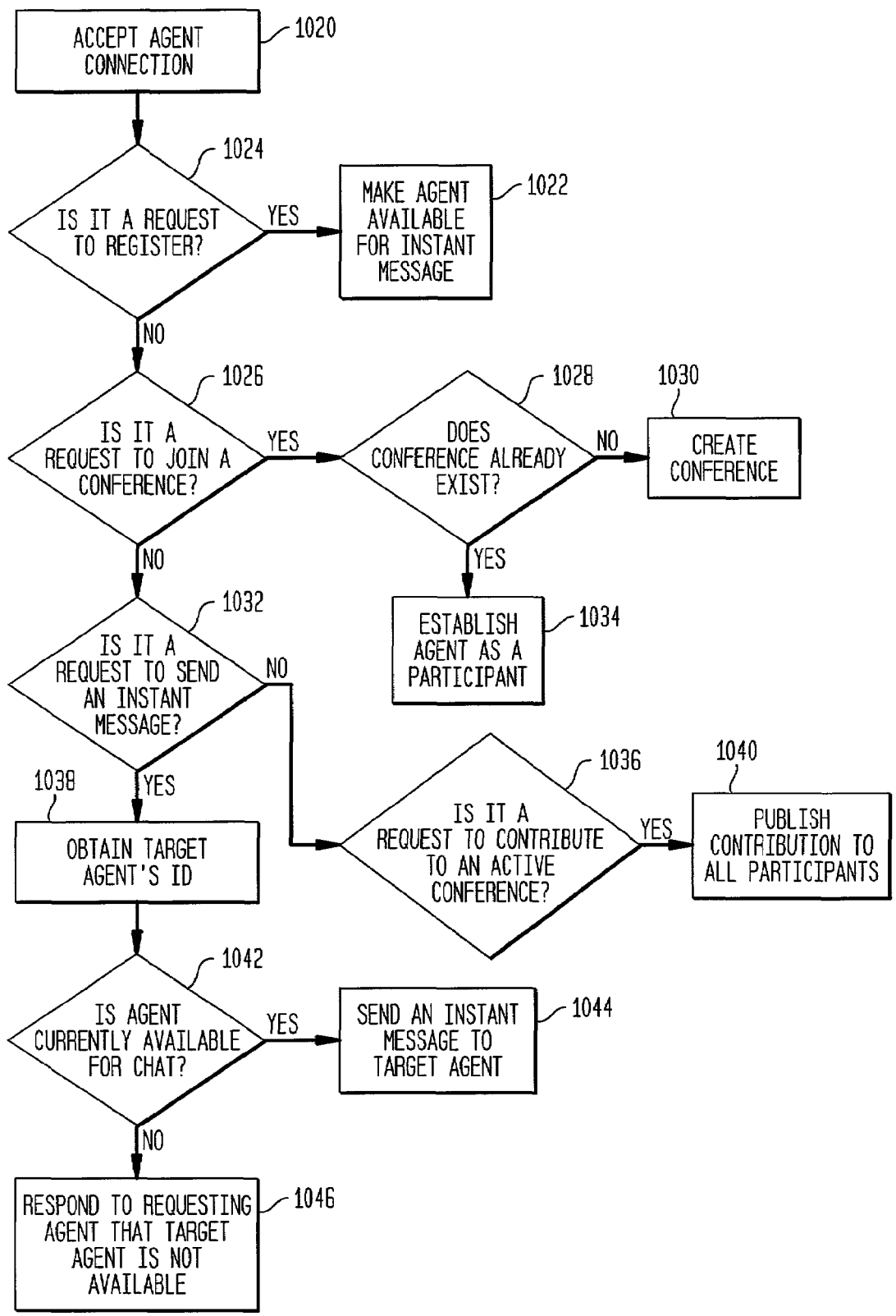
FIG. 34 is a flowchart showing the agent collaboration subsystem of the present invention.

FIG. 34 is a flowchart depicting the agent collaboration subsystem of the present invention. Beginning in step 1020, the collaborator subsystem accepts a new connection from a mobile agent. A decision point is then reached in step 1024, where a determination is made as to whether the request is to "register." If a positive determination is made, control passes to step 1022, where the agent is made available for instant messaging. The agent's availability is immediately published to all connected agents. If a negative determination is made in step 1024, execution continues at step 1026. At this point the collaborator checks to see if the request received is to join a conference. If it is, another decision point is reached in step 1028, wherein the subsystem checks to see if the conference has already been established. If the conference does not exist, it is created in step 1030. If the conference does exist, the agent will be established as a participant in step 1034. If the request is one other than to join a conference, a check is made in step 1032 to determine if the request is to send an instant message. If it is not a request to send an instant message, processing continues to step 1036, wherein the request is checked to see if it contains a contribution for an ongoing conference. If so, step 1040 is executed, whereby the contribution data is published to all conference participants. If step 1032 determines that the request was intended to send an instant message, the target agent's "run as" identifier and host name or IP address are extracted from the message in step 1038. The collaborator subsystem then checks to see if the identified mobile agent is available for chatting in step 1042. If the agent is available, an instant message is sent to it in step 1044. If the target agent is no longer available for a chat, then in step 1046, a response is sent back to the requesting agent indicating that the target agent is no longer available.

Having thus described the invention in detail, it is to be understood that the foregoing description is not intended to limit the spirit and scope thereof. Accordingly, what is desired to be protected by Letters Patent is set forth in the appended claims.

What is claimed is:

1. A method for providing parallel execution of computing tasks in a heterogeneous computing environment having a plurality of computing hosts, comprising:
   partitioning a computing task into small tasks;
   assigning each of the small tasks to mobile agents stored at a central server;
   monitoring the computing hosts for detecting an indication that migration needs to be initiated;
   determining available computing hosts in the heterogeneous computing environment;
   automatically transferring said mobile agents to determined available computing hosts responsive to a detected indication that migration needs to be initiated;
   executing said mobile agents at the available computing hosts using execution code from the central server in response to a request from the available computing hosts; and
   maintaining, at a second computing host at which none of said mobile agents are executing, stack trace and state information about each of said mobile agents to allow one or more of said mobile agents to be reconstructed at an alternate computing host using said stack trace and state information.

2. The method of claim 1, wherein said indication that migration needs to be initiated comprises an indication of network latency.

3. The method of claim 1, further comprising transferring the execution code from the central server to virtual machines at the available computing hosts.

4. The method of claim 3, wherein the step of transferring the execution code is performed in response to a request by a mobile agent.

5. The method of claim 4, wherein the step of transferring the execution code is performed by a web server.

6. The method of claim 1, wherein the step of executing the mobile agents is performed in virtual machines at the computing hosts without modification of the virtual machines.

7. The method of claim 1 further comprising monitoring execution of the mobile agents at the available computing hosts.

8. The method of claim 1 further comprising allowing the mobile agents to collaborate over the heterogeneous computing environment as the mobile agents execute at the available computing hosts.

9. The method of claim 1, wherein the mobile agents are executed in real time.

10. The method of claim 1, wherein said step of determining available computing hosts is performed in real time.

11. The method of claim 1, wherein the indication comprises an indication of hostile attack.

12. The method of claim 1, wherein the indication comprises an indication of hacking.

13. The method of claim 1, wherein the indication comprises an indication of network failure.

14. The method of claim 1 wherein the indication comprises an indication of computer hardware failure.

15. The method of claim 1 further comprising reconstructing one or more of said mobile agents at said second computing host using said stack trace and state information stored at said first computing host.

16. A method for providing parallel computing using mobile agents in a heterogeneous computing environment having a plurality of computing hosts, comprising:
   assigning a computing task to one or more mobile agents stored at a central server;
   monitoring the computing hosts for detecting an indication that migration needs to be initiated;
   transferring the one or more mobile agents to one or more available computing hosts responsive to a detected indication that migration needs to be initiated;
   transferring execution code from the central server to the one or more available computing hosts in response to a request from the available computing hosts;
   executing the one or more mobile agents at the one or more available computing hosts using the execution code; and
   storing stack trace and real-time state information about the one or more mobile agents at a first alternate computing host on which none of the one or more mobile agents are executing to allow the one or more mobile agents to be reconstructed at a second alternate computing host.

17. The method of claim 16, wherein said detected indication that migration needs to be initiated is an indication of network latency, said method further comprising, prior to transferring the mobile agents, the step of:
   halting transferring of the mobile agents if said detected network latency exceeds a threshold.

18. The method of claim 17 comprising transferring the mobile agents if utilization of computing hosts fails to exceed a predetermined threshold.

19. The method of claim 16, wherein the step of transferring said one or more mobile agents to one or more available computing hosts comprises transferring data relating to said one or more mobile agents to said one or more available computing hosts.

20. A method for migrating a software application running in a virtual machine from a primary host to a secondary host comprising;
constructing an application using a plurality of mobile agents stored in a central server;
transferring the plurality of mobile agents to a first computing host;
executing the plurality of mobile agents at said first computing host;
maintaining stack trace and state information about each of the plurality of mobile agents at a second computing host on which none of the plurality of mobile agents are executing;
detecting an indication to migrate the application, wherein said indication comprises one of the group consisting of: network latency, hostile attack, hacking, network failure and computer hardware failure;
in response to a detected indication, automatically migrating the application in its entirety from said first computing host to a third computing host without modifying the virtual machine at said third computing host by reconstructing each of the plurality of mobile agents at said third computing host using said stack trace and state information; and
executing the plurality of mobile agents at the third computing host using execution code provided by the central server in response to a request from the third computing host.

21. The method of claim 20 further comprising resuming execution of the mobile agent at said third computing host at a point where execution was halted.

22. The method of claim 21, wherein said stack trace and state information comprises information about an execution thread of the mobile agent as it existed at said first computing host prior to being transferred to said third computing host.

23. The method of claim 20 further comprising:
continuing monitoring for another indication to migrate the application;
continuing migrating the application to other hosts.

24. A computer system for providing parallel execution of computing tasks in a heterogeneous computing environment comprising at least two computing hosts, said system comprising;
a dispatcher for partitioning the computing task into a plurality of small tasks and dispatching the small tasks;
mobile agents for receiving small tasks from the dispatcher;
means for monitoring execution of the mobile agents at the computing hosts;
means for detecting over-utilization of one of the computing hosts and for issuing a warning when one of the computing hosts is over-utilized,
computing resources on a network including virtual machines for executing mobile agent software code;
means for transferring the mobile agents to the computing resources; and
means for automatically transferring execution code as well as stack trace and state information about each of the mobile agents responsive to detected over-utilization of one of the computing hosts from a central server to the computing resources, the computing resources receiving and executing one of the small tasks assigned to a mobile agent in the virtual machines using the execution code from the central server in response to a request from the available computing resources and the means for transferring execution code maintaining stack trace and state information about each of the mobile agents at a first computing host where none of the mobile agents are executing to allow each of the mobile agents to be reconstructed at a second computing host.

25. The computer system of claim 24 wherein the central server comprises a web server.

26. The computer system of claim 25, wherein the web server is located at a first organization.

27. The apparatus computer system of claim 26 further comprising an agent execution environment located at a second organization.

28. The computer system of claim 27 further comprising firewalls at said first and second organizations to allow execution code for said mobile agents to be exchanged between said first and second organizations.

29. The computer system of claim 24 further comprising means for monitoring execution of the small tasks.

30. The computer system of claim 24 further comprising collaboration means for allowing the mobile agents to communicate and share information in real time.

31. The computer system of claim 24, wherein the in mobile agents execute in real time.

32. The computer system of claim 24, further comprising storage means for storing real time state information about the mobile agents as the mobile agents execute at the computing resources.

33. The computer system of claim 24 further comprising:
means for monitoring execution of the mobile agents at the computing hosts; and
means for detecting over-utilization of one of the computing hosts and for issuing a warning when one of the computing hosts is over-utilized.

34. The computer system of claim 24, wherein said means for transferring said mobile agents to said computing resources comprises means for transferring data relating to said mobile agents to said computing resources.

35. A method for providing realistic thread migration which comprises:
instantiating a mobile agent thread at a first computing host;
processing said mobile agent thread at said first computing host;
storing stack trace and state information about said mobile agent thread at a second computing host at which said mobile agent thread is not executing as said mobile agent thread executes at said first computing host;
detecting an indication to migrate said mobile agent thread and in response to said indication;
stopping execution of said mobile agent thread;
automatically transferring the execution code for said mobile agent thread from a central server to a third computing host; and
automatically transferring said stack trace and state information about said mobile agent thread to said third computing host.

36. The method of claim 35, wherein the steps are carried out without the need to explicitly write any additional software code to either initiate, manage, or facilitate the transfer of a mobile agent during said process of thread migration.

37. The method of claim 35 further comprising:
receiving said stack trace and state information about said mobile agent thread at said third computing host;
reconstructing said mobile agent thread at said third computing host using said stack trace and state information about said mobile agent thread; and
continuing processing of said mobile agent thread at said third computing host at a point at which execution of said thread was stopped at said first computing host.

38. The method of claim 37 wherein the step of automatically transferring said stack trace and state information about said mobile agent thread further comprises serializing the state information about said mobile agent thread.

* * * * *